US010628658B2

(12) United States Patent
Bredno et al.

(10) Patent No.: US 10,628,658 B2
(45) Date of Patent: Apr. 21, 2020

(54) CLASSIFYING NUCLEI IN HISTOLOGY IMAGES

(71) Applicant: Ventana Medical Systems, Inc., Tucson, AZ (US)

(72) Inventors: Joerg Bredno, San Francisco, CA (US); Christophe Chefd'hotel, Sunnyvale, CA (US); Kien Nguyen, Ho Chi Minh (VN)

(73) Assignee: Ventana Medical Systems, Inc., Tucson, AZ (US)

( * ) Notice: Subject to any disclaimer, the term of this patent is extended or adjusted under 35 U.S.C. 154(b) by 277 days.

(21) Appl. No.: 15/591,936

(22) Filed: May 10, 2017

(65) Prior Publication Data

US 2017/0372117 A1    Dec. 28, 2017

Related U.S. Application Data

(63) Continuation of application No. PCT/EP2015/076105, filed on Nov. 9, 2015.
(Continued)

(51) Int. Cl.
*G06K 9/46* (2006.01)
*G06K 9/00* (2006.01)
(Continued)

(52) U.S. Cl.
CPC ....... *G06K 9/0014* (2013.01); *G06K 9/00147* (2013.01); *G06K 9/20* (2013.01);
(Continued)

(58) Field of Classification Search
CPC ...... G06K 9/0014; G06K 9/20; G06K 9/4604; G06K 9/4642; G06K 9/00147; G06K 9/6223; G06K 9/6269; G06T 7/00
See application file for complete search history.

(56) References Cited

U.S. PATENT DOCUMENTS 5,933,519 A * 8/1999 Lee ..................... G06K 9/00127
                                                            382/133
6,026,174 A * 2/2000 Palcic ...................... G01N 1/30
                                                            382/128
(Continued)

FOREIGN PATENT DOCUMENTS

WO    WO2013113707 A1    8/2013
WO    2014/165422 A1     10/2014

OTHER PUBLICATIONS

Tuzel, Oncel, Lin Yang, Peter Meer, and David J. Foran. "Classification of hematologic malignancies using texton signatures." Pattern Analysis and Applications 10, No. 4 (2007): 277-290. (Year: 2007).*

(Continued)

*Primary Examiner* — Carol Wang
(74) *Attorney, Agent, or Firm* — Kilpatrick Townsend & Stockton LLP

(57) ABSTRACT

Disclosed, among other things, is a computer device and computer-implemented method of classifying cells within an image of a tissue sample comprising providing the image of the tissue sample as input; computing nuclear feature metrics from features of nuclei within the image; computing contextual information metrics based on nuclei of interest with the image; classifying the cells within the image using a combination of the nuclear feature metrics and contextual information metrics.

32 Claims, 22 Drawing Sheets

Related U.S. Application Data

(60) Provisional application No. 62/077,536, filed on Nov. 10, 2014, provisional application No. 62/144,364, filed on Apr. 8, 2015.

(51) Int. Cl.
   *G06K 9/20* (2006.01)
   *G06T 7/00* (2017.01)
   *G06K 9/62* (2006.01)

(52) U.S. Cl.
   CPC ......... *G06K 9/4604* (2013.01); *G06K 9/4642* (2013.01); *G06T 7/00* (2013.01); *G06K 9/6223* (2013.01); *G06K 9/6269* (2013.01)

(56) References Cited

U.S. PATENT DOCUMENTS

| | | | |
|---|---|---|---|
| 9,582,027 B2 | 2/2017 | Coutts | |
| 10,203,275 B2 | 2/2019 | Herzog | |
| 10,241,115 B2* | 3/2019 | Pierce | G06T 7/41 |
| 2003/0165263 A1* | 9/2003 | Hamer | G06K 9/00127 382/133 |
| 2006/0204071 A1* | 9/2006 | Ortyn | G01J 3/2889 382/133 |
| 2007/0250301 A1* | 10/2007 | Vaisberg | G01N 15/1475 703/11 |
| 2008/0262384 A1* | 10/2008 | Wiederkehr | G01N 33/57411 600/569 |
| 2009/0087074 A1* | 4/2009 | Wong | G06K 9/00147 382/133 |
| 2009/0257640 A1* | 10/2009 | Gossage | G06K 9/0014 382/133 |
| 2010/0111396 A1* | 5/2010 | Boucheron | G06K 9/0014 382/133 |
| 2010/0177950 A1* | 7/2010 | Donovan | G16H 50/30 382/133 |
| 2010/0232675 A1* | 9/2010 | Ortyn | G01N 15/147 382/134 |
| 2010/0254589 A1* | 10/2010 | Gallagher | G06K 9/0014 382/133 |
| 2012/0034647 A1 | 2/2012 | Herzog | |
| 2013/0230230 A1* | 9/2013 | Ajemba | G06T 7/0012 382/133 |
| 2014/0162280 A1 | 6/2014 | Roggenbuck | |
| 2014/0227682 A1* | 8/2014 | Seth | C12Q 1/70 435/5 |
| 2016/0070949 A1* | 3/2016 | Tunstall | G06K 9/0014 382/133 |
| 2016/0084839 A1* | 3/2016 | Dolled-Filhart | G01N 33/57415 424/133.1 |
| 2016/0193334 A1* | 7/2016 | Strack | A61K 39/39558 424/133.1 |

OTHER PUBLICATIONS

Plissiti, Marina E., Christophoros Nikou, and Antonia Charchanti. "Combining shape, texture and intensity features for cell nuclei extraction in Pap smear images." Pattern Recognition Letters 32, No. 6 (2011): 838-853. (Year: 2011).*

Shen, Linlin, Jiaming Lin, Shengyin Wu, and Shiqi Yu. "HEp-2 image classification using intensity order pooling based features and bag of words." Pattern Recognition 47, No. 7 (2014): 2419-2427. (Year: 2014).*

Long, Fuhui, Hanchuan Peng, Damir Sudar, Sophie A. Lelièvre, and David W. Knowles. "Phenotype clustering of breast epithelial cells in confocal images based on nuclear protein distribution analysis." BMC cell biology 8, No. 1 (2007): S3. (Year: 2007).*

Thibault, Guillaume, et al. "Poster: Classification of cell nuclei using shape and texture indexes." In 16th International Conference in Central Europe on Computer Graphics, Visualization and Computer Vision 2008, WSCG'2008. 2008. (Year: 2008).*

Na, Shi, Liu Xumin, and Guan Yong. "Research on k-means clustering algorithm: An improved k-means clustering algorithm." In 2010 Third International Symposium on intelligent information technology and security informatics, pp. 63-67. IEEE, 2010. (Year: 2010).*

Chen, Yung-Fu, Po-Chi Huang, Ker-Cheng Lin, Hsuan-Hung Lin, Li-En Wang, Chung-Chuan Cheng, Tsung-Po Chen, Yung-Kuan Chan, and John Y. Chiang. "Semi-automatic segmentation and classification of pap smear cells." IEEE Journal of Biomedical and Health Informatics 18, No. 1 (2013): 94-108. (Year: 2013).*

Haralick, Robert M., and Karthikeyan Shanmugam. "Textural features for image classification." IEEE Transactions on systems, man, and cybernetics 6 (1973): 610-621. (Year: 1973).*

Atupelage, C. et al., Computational hepatocellular carcinoma tumor grading based on cell nuclei classification, Journal of Medical Imaging, (2014), pp. 34501 (sheets 1-14), vol. 1 No. 3.

Chen, D.S. et al., Molecular Pathways: Next-Generation Immunotherapy-Inhibiting Programmed Death-Ligand 1 and Programmed Death-1, Clin Cancer Res, (2012), pp. 6580-6587, vol. 18.

Garcia Rojo, M. et al., Review of imaging solutions for integrated quantitative immunohistochemistry in the Pathology daily practice, Folia Histochemica et Cytobiologica, (2009), pp. 349-354, vol. 47 No. 3.

Keir, M.E. et al., PD-1 and its Ligands in Tolerance and Immunity, Ann Rev Immunol, (2008), pp. 677-704, vol. 26 No. 1.

Kien Nguyen et al., Using Contextual Information to Classify Nuclei in Histology Images, IEEE 12th International Symposium on Biomedical Imaging (ISBI), (2015), pp. 995-998.

Kong, J. et al., A Comprehensive Framework for Classification of Nuclei in Digital Microscopy Imaging: An Application to Diffuse Gliomas, 8th IEEE International Symposium on Biomedical Imaging: From Nano to Macro, (2011), pp. 2128-2131.

Mu et al., 2011, "High expression of PD-L1 in lung cancer may contribute to poor prognosis and tumor cells immune escape through suppressing tumor infiltrating dendritic cells maturation", Medical Oncology, 28:682-688.

Nguyen Kien, et al., Prostate Cancer Grading: Use of Graph Cut and Spatial Arrangement of Nuclei, IEEE Transact. Med. Imag., 2014, 2254-2270, 33.

Thompson, R.H. et al., Costimulatory B7-H1 in renal cell carcinoma patients: Indicator of tumor aggressiveness and potential therapeutic target, PNAS, (2004), pp. 17174-17179, vol. 101 No. 49.

Ulas, A. et al., Hybrid Generative-Discriminative Nucleus Classification of Renal Cell Carcinoma, Similarity-Based Pattern Recognition, (2011), pp. 77-89, vol. 7005.

* cited by examiner (a)

(b)

(a)

(b)

(c)

(d)

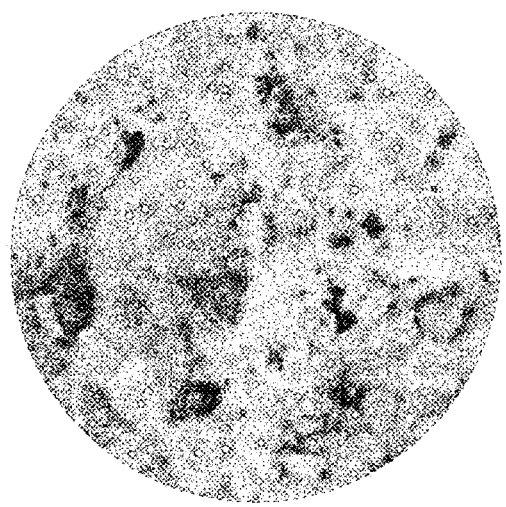
(e)
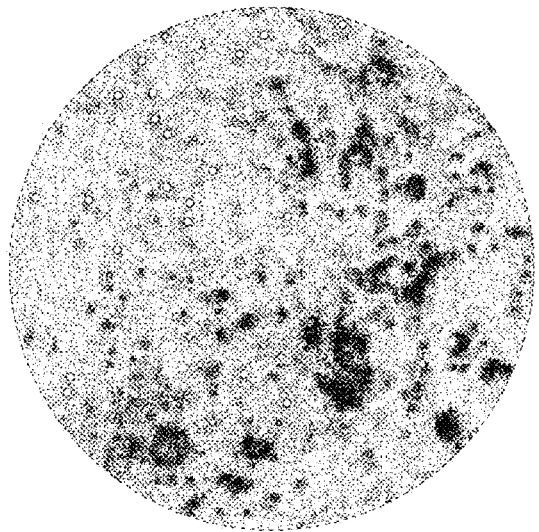
(f)
FIG. 9 (Cont..)

* Area with PD-L1-positive immune cells = 3.2mm²
* Tumor area = 43.9mm²

* Area with PD-L1-positive immune cells = 3.2mm²
* Tumor area = 43.9mm²

CLASSIFYING NUCLEI IN HISTOLOGY IMAGES

CROSS REFERENCE TO RELATED APPLICATIONS

This present application is a continuation of International Patent Application No. PCT/EP2015/076105 filed Nov. 9, 2015, which claims priority to and the benefit of U.S. Provisional Patent Application 62/144,364 filed Apr. 8, 2015, and the benefit of U.S. Provisional Patent Application No. 62/077,536 filed Nov. 10, 2014. Each of the above patent applications is incorporated herein by reference as if set forth in its entirety.

BACKGROUND

The automated identification of biological structures from histopathology images is a central task in digital pathology. Given a whole slide tissue image, many applications require identification of different types of cells or other structures in the images that appear in normal tissue, tumor tissue, necrosis, lymphatic regions, and stroma. In fact, a quantitative assessment of the presence of such cells or structures in a sample is often needed to determine the impact of a particular therapy, such as the selection of particular chemotherapeutic agents for treating cancer. For example, tumor cells expressing PD-L1 (Programmed death-ligand 1) are believed to suppress immune responses through activation of the PD-1/PD-L1 pathway and data indicates that PD-L1 tumor status might be predictive for responses to PD-1- and PD-L1-directed therapies. As such, PD-L1 nucleus classification and quantification is an important task in digital pathology.

Quantitative PD-L1 tissue analysis frequently requires the detection and labeling of cells or nuclei according to type (tumor, immune, stroma, etc.) or response to PD-L1 staining. The PD-L1 biomarker may be expressed on the membrane of tumor cells and immune cells. Any biologically meaningful automated analysis of image data must first detect all the cells and staining patterns and identify them as one of (1) a PD-L1 positive immune cell; (2) a PD-L1 positive tumor cell; (3) a PD-L1 negative immune cell (a cell visible by its nucleus with no immunohistochemistry (IHC) staining; (4) a PD-L1 negative tumor cell (a cell identified by the appearance of its nucleus with no PD-L1 staining); (5) any other cell, including stroma cell, normal tissue cell, etc.; and/or (6) staining not representing a cell, including artifacts, background staining, etc.

In the context of PD-L1, analysis must not only detect cells and their IHC stain, but additionally determine and classify the reason for the presence of the IHC stain. For example, local stain uptake may be caused by a PD-L1 positive tumor cell, a PD-L1 positive immune cell, or non-target artificial staining. Moreover, immune and tumor cells may occur together in a close spatial neighborhood, with PD-L1 positive and negative cells touching each other. Indeed, in order to correctly identify a single cell, the appearance of the cell's nucleus and possible membrane staining must be assessed together with multiple cells, their appearance, and the staining pattern in their local neighborhood.

Due to the large size of a whole slide image at high magnification and the large volume of data to be processed, assessment of the images by a pathologist is problematic. Indeed, the number of cells or cell nuclei present in a whole slide tissue image is typically of the order of $10^4$, making it difficult, if not infeasible, for a pathologist to manually perform such a task. It is therefore desirable to develop an automatic quantitation assay that is able to identify each cell or cell nucleus based on its own appearance and the appearance of cells in its local tissue context.

BRIEF SUMMARY

In one aspect of the present disclosure relates to a computer system for classifying cells within an image of a tissue sample stained in an IHC assay for the presence of a PD-L1 biomarker comprising one or more processors and at least one memory, the at least one memory storing non-transitory computer-readable instructions for execution by the one or more processors to cause the one or more processors to compute nuclear feature metrics, wherein the nuclear feature metrics are derived from features within cell nuclei in the image of the tissue sample; compute contextual information metrics of nuclei of interest within the image of the tissue sample; and classify cells within the image of the tissue sample based on the nuclear feature metrics and contextual information metrics, wherein the cells are classified as at least one of positive immune cells, positive tumor cells, negative immune cells, and negative tumor cells, or other cells.

In some embodiments, the nuclear features are selected from the group consisting of morphology features, appearance features, and background features. In some embodiments, the nuclear features are computed on image channels that represent the local overall staining intensity, the intensity of an IHC label indicative of the presence of a PD-L1 biomarker, and the local counterstain intensity indicative of the presence of a cell nucleus.

In some embodiments, the contextual information metrics are derived (for a nucleus of interest) from at least one of (i) data describing neighboring nuclei; and (ii) image texture features surrounding a nucleus of interest.

In some embodiments, the image texture features are derived from an image patch surrounding a nucleus of interest in the image of the tissue sample. In some embodiments, the derived image texture features are selected from the group consisting of texton histogram features, Garbor features, Haralick features, histogram of intensity features, and histogram of gradient magnitude and gradient orientation features.

A "neighboring nucleus" as used herein is, for example, a nucleus lying within a predefined maximum distance from the nucleus of interest within an image.

An "image texture feature" is, for example, a property value or metrics computed by an image analysis function and which quantifies the texture of an image region. Image texture features provide information about the spatial arrangement of color or intensities in an image or selected region of an image.

A "histogram of intensity feature" as used herein is, for example, a distribution of occurrence frequencies of intensity values of an image or of an image channel. For example, a histogram can be represented as a graph showing the number of pixels in an image at each different intensity value found in that image.

A "texton" is, for example, a set of one or more attributes of a pixel blob or a set of pixels lying less than a maximum distance apart from a reference pixel, whereby said attributes have been observed or are expected to be repetitive within an image. For example, a texton can be a frequently co-occurring combination of oriented linear filter outputs. The pixel blob can be, for example, a nuclear blob or a pixel area identified as lying within a cell comprising a nucleus. The reference pixel can be, for example, a nuclear center or cell center or cell membrane. Thus, a "texton" may be considered as a "visual word", e.g. an ellipse of a particular size or dimension, a circle of a particular average intensity value, a pixel blob having a particular intensity distribution or pattern, or the like.

A "texton histogram feature" is, for example, a distribution of occurrence frequencies of textons ("visual words") identified in the image or in a particular image channel. For example, a texton histogram can be represented as a graph showing the number of textons of a particular type. For example, the following three types of textons may be extracted from an image: "ellypsoid1" having the axes a1.1 and a1.2, "ellypsoid2" having the axes a2.1 and a2.2, and "circle1" with diameter dl and intensity value range=[09-110]. The texton histogram feature may be a histogram being indicative that texton "ellypsoid1" was found 79 times, texton "ellipsoid2" was found 1.124 times in the image and that "circle1" was found 34 times in the image.

A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. A "gradient orientation feature" may be a data value that indicates the orientation of the gradient within said coordinate system.

A "positive tumor cell" or "PD-L1 positive tumor cell" is a cell having been identified as a tumor cell and which predominantly expresses the PD-L1 biomarker. A "negative tumor cell" or "PD-L1 negative tumor cell" is a cell having been identified as a tumor cell and which expresses the PD-L1 biomarker only weakly or not at all. "Predominantly" may mean, for example, that the pixel intensities of the color channel used for identifying light signals emitted from a stained PD-L1 biomarker are above a given threshold intensity and a "weak expression" may mean, for example, that the pixel intensities of the color channel used for identifying light signals emitted from a stained PD-L1 biomarker are below a given threshold intensity. The intensity of the signal caused by the PD-L1 staining may be one feature having an impact on the classification of a cell as being a tumor-cell or a non-tumor cells, but additional features are evaluated as well and therefore the classification may return PD-L1 positive cells classified as tumor-cells as well as PD-L1 positive cells classified as non-tumor cells. A "negative lymphocyte" or "PD-L1 negative lymphocyte" is a cell having been classified as a lymphocyte cell which expresses the PD-L1 biomarker only weakly or not at all. A "positive lymphocyte" or "PD-L1 positive lymphocyte" is a lymphocyte having been identified as a tumor cell and which predominantly expresses the PD-L1 biomarker.

A "foreground segmentation mask" is, for example, an image mask created by a segmentation algorithm that allows separating one or more pixel blobs (to be used as "foreground pixels") from other pixels (constituting the "background"). For example, the foreground segmentation mask may be generated by a nuclear segmentation algorithm and the application of the foreground segmentation mask on an image depicting a tissue section may allow identification of nuclear blobs in an image.

In some embodiments, the derived image texture feature is a texton histogram feature. In some embodiments, the texton histogram feature is derived by (1) applying a bank of maximum response filters on the image of the tissue sample to obtain a list of filter response images; (2) clustering the filter responses from the filter response images into textons; (3) assigning each pixel in the image of the tissue sample into one of the textons; and (4) computing a texton histogram from all the pixels in an image patch surrounding a nucleus of interest. In some embodiments, the derived image texture feature is a histogram of intensity features, and wherein the histogram of intensity features is derived from image channels selected from the group consisting of a primary stain channel, a counterstain channel, an IHC stain channel (e.g. a channel indicative of the presence of PDL1), and a luminance channel. In some embodiments, differences in signals from the different image channels are analyzed to compute intensity-based features within the image patch surrounding the nucleus of interest.

A "filter bank" is a collection of two or more filters". For example, a filter bank can comprise a mix of edge, bar and spot filters at multiple scales and orientations and at different phases, e.g. Laplacian of Gaussian filters and Gaussian filters. There exist rotationally invariant as well as rotationally variant filter sets. An example for a multi scale, multi orientation filter bank with 48 filters is the Leung-Malik (LM) Filter Bank. Images are often corrupted by random variations in intensity or have poor contrast. Applying a filter on an image to obtain one or more filtered images may be performed in order to transform pixel intensity values to derivative data values which reveal relevant image characteristics, e.g. image characteristics representing a particular texture and/or which have a better contrast.

In some embodiments, a filter bank comprising "maximum response" (MR) filters can be used. A maximum response filter bank is a filter bank comprising multiple copies of at least one filter of a particular type, each copy being oriented differently. By applying the multiple copies of said particular filter at different rotation angles on pixel intensities of an image or image regions, the one of said different orientations is identified where the filter application returned the largest signal. The MR filter set may thus allow to identify an angle for a particular nucleus of interest at which a particular filter type returned a maximum signal and to solely consider the filtered image provided by said particular filter for further analysis. Alternatively, the angle may be used for aligning the filtered image or any derivative data value to other features extracted from the image in a way to achieve rotational invariance of the filtering results. Thus, using an MR filter bank may comprise MR filters being able to record the angle of maximum response which allows the computation of higher order co-occurrence statistics on orientation which may be used as a texture feature metrics. Using MR filter banks capable of recording the angle of the maximum response allow generating more significant textons by mapping rotated features to the same texton, thereby reducing the dimensions of the feature space to be considered during the clustering.

In some embodiments, the derived image texture features are Haralick features, which are derived by computing a co-occurrence matrix based on the angular relationship between a pixel and its specified neighbor in the image patch. In some embodiments, the data describing neighboring nuclei is derived from a histogram of cluster assignment. In some embodiments, the histogram of cluster assignment is derived by (1) applying a K-means algorithm on nuclear features vectors to obtain cluster centers; for example, the cluster center may also be a nuclear feature vector derived from all nuclear feature vectors assigned to the cluster center's cluster; (2) assigning individual neighboring nuclei of a particular nucleus of interest to a closest cluster center;

and (3) computing the histogram of cluster assignment based on the assignments. A histogram of cluster assignment is a histogram indicating how many nuclei in a particular image or image region are assigned to a particular cluster. In some embodiments, instructions are executed to (2a) measure the Euclidean distance from the nuclear feature vector of each individual neighboring nucleus to the center of each cluster; and (2b) assign the individual neighboring nucleus to the cluster whose center is closest to the nuclear feature vector of that nucleus. In some embodiments, the assigning of individual neighboring nuclei of a particular nucleus of interest to a closest cluster center may be performed in two sub-steps 2a, 2b which may be repeated iteratively and whereby the cluster centers are re-calculated to provide refined cluster centers. In some embodiments, the cells of the image of the tissue sample are classified with a support vector machine. In some embodiments, the sample is a lung tissue sample.

In another aspect of the present disclosure is a computer-implemented method of classifying cells within an image of a tissue sample stained in an IHC assay for the presence of a PD-L1 biomarker comprising computing nuclear feature metrics from features of nuclei within the image of the tissue sample; computing contextual information metrics based on nuclei of interest with the image of the tissue sample; and classifying the cells within the image of the tissue sample using a combination of the nuclear feature metrics and contextual information metrics (as input of the classifier), wherein the cells are classified as at least one of positive immune cells, positive tumor cells, negative immune cells, and negative tumor cells, or other cells. In some embodiments, the method further comprises the step of creating a foreground segmentation mask to identify individual nuclei within the cells. In some embodiments, the nuclear features are selected from the group consisting of morphology features, appearance features, and background features.

In some embodiments, the contextual information metrics are derived from at least one of (i) data describing neighboring nuclei; and (ii) image texture features surrounding a nucleus of interest. In some embodiments, the method further comprising the step of generating image patches surrounding a particular nucleus of interest, wherein the image texture features are derived from the generated image patches. In some embodiments, the derived image texture features surrounding the nucleus of interest are selected from the group consisting of texton histogram features, Garbor features, Haralick features, histogram of intensity features, and histogram of gradient magnitude and gradient orientation features. In some embodiments, the derived image texture feature is a texton histogram feature. In some embodiments, the texton histogram feature is derived by providing instructions to (1) apply a bank of maximum response filters on the image of the tissue sample to obtain a list of filter response images; for example, the filter bank may comprise multiple copies of at least one filter type, each copy having a different orientation; each filter response image may comprise a plurality of filter responses, whereby a "filter response" is the result of applying one of the filters having a particular orientation on a particular sub-region of the image; the size of said sub-region may depend on the applied filter; A filter response represents some features in said sub-region such as edges or blobs identified in said sub-region. A "filter response" of a maximum response filter is the maximum filter response obtained when applying multiple copies of the same filter differing from each other only in their orientation on a particular sub-region; as only the maximum filter response is obtained and further processed, the filter responses obtained by applying the maximum response filter bank is rotation invariant; A filter response can, for example, represent or indicate one or more features such as edges or blobs identified in an image or image sub-region. A filter response can, for example, be a convolution and/or correlation filter or can be a weighted data value derived from multiple image pixels on which the filter was applied; (2) cluster the filter responses from the filter response images into textons; for example, a "filter response" may be a set of pixel data values being derived by applying a particular filter on pixel intensity values of a particular image region; the cluster centers identified during the clustering or data values derived from said clusters or cluster centers may be used as textons (3) assign each pixel in the image of the tissue sample into one of the textons; and (4) compute a texton histogram from all the pixels in an image patch surrounding a nucleus of interest.

In some embodiments, the derived image texture feature is a histogram of intensity features, and the histogram of intensity features is computed from images channels selected from the group consisting of a primary stain channel, a counterstain channel, an IHC stain channel (e.g. a channel indicative of the presence of PDL1), and a luminance channel. For example, a "luminance image" is a grayscale image that contains data from all of the wavelengths in the light spectrum received via a white light channel. In some embodiments, differences in signals from the different image channels are captured to compute intensity-based features within the image patch surrounding the nucleus of interest. In some embodiments, the derived image texture features are Haralick features which are derived by providing instructions to compute a co-occurrence matrix based on the angular relationship between a pixel and its specified neighbor in the image patch.

In some embodiments, the data describing neighboring nuclei is derived from a histogram of cluster assignment. In some embodiments, the histogram of cluster assignment is derived by (1) applying a K-means algorithm on nuclear features vectors to obtain cluster centers; for example, each nucleus (or nuclear blob) identified in the image is represented by a respective nuclear features vector, the nuclear features vector comprising the nuclear feature metrics and contextual information metrics of said nucleus; the application of the K-means clustering algorithm may comprise iteratively identifying clusters of similar nuclear feature vectors and respective cluster centers; the cluster centers may iteratively be refined; (2) assigning individual neighboring nuclei of a particular nucleus of interest (represented by a respective nuclear feature vector) to a closest cluster center; and (3) computing the histogram of cluster assignment based on the assignments. Thus, for example, the "histogram of cluster assignment" indicates the number of neighbor cells of the nucleus of interest which are assigned to a particular cluster.

In some embodiments, the method further comprises (2a) measuring the Euclidean distance from the nuclear feature vector of each individual neighboring nucleus to the center of each cluster; and (2b) assigning the individual neighboring nucleus to the cluster whose center is closest to the nuclear feature vector of that nucleus. In some embodiments, the cells of the image of the tissue sample are classified with a support vector machine. An Euclidean distance is the "ordinary" (i.e. straight-line) distance between two points in Euclidean space. In case a nuclear feature relates to a non-metrical data value, this data value may be transformed into a metric value that can be represented in a metric space in order to allow computing of the Euclidian distance. In addition or alternatively, additional distance functions may be employed for calculating the distance of nuclear features which is the basis for determining the similarity of nuclear feature vectors (and thus the similarity of the respectively represented nuclei). The more similar the nuclear feature metrics of different nuclei and the larger the number of similar nuclear features, the higher the likelihood that two nuclear feature vectors and respective nuclei will be assigned to the same cluster center.

Another aspect of the present disclosure is a cell analyzer comprising the computer system described herein and an imaging apparatus.

In another aspect of the present disclosure is a method of scoring a tumor sample for PD-L1 expression, the method comprising (a) identifying tumor cells and immune cells in the tumor sample using any of the computer devices, cell analyzers, or methods described herein, (b) determining the number of tumor cells and immune cells expressing PD-L1 and/or the relative intensity of PD-L1 expression in said cells; and (c) categorizing the tumor according to the PD-L1 expression determined in (b). In some embodiments, the expression of PD-L1 is determined by specifically detecting PD-L1 protein and/or PD-L1 mRNA in the tumor. In some embodiments, the cells are considered to express PD-L1 when the cell has at least partial membrane staining of PD-L1 protein detected by IHC. In some embodiments, the tumor is categorized according to one or both of a modified H-score (MHS) or a modified proportion score (MPS), both computed from step (b).

The H-score is, for example, a method of assessing the extent of nuclear immunoreactivity. In dependence on the biomarker, different approaches for H-score calculation may be used. To give an illustrative example, the H-score for steroid receptor nuclei can be obtained by the formula: 3× percentage of strongly staining nuclei+2× percentage of moderately staining nuclei+percentage of weakly staining nuclei, giving a range of 0 to 300.

In some embodiments, assigning the MHS comprises (i) estimating, across all of the viable tumor cells and stained mononuclear inflammatory cells in all of the examined tumor nests, four separate percentages for cells that have no staining, weak staining (+1), moderate staining (+2) and strong staining (+3), wherein a cell must have at least partial membrane staining to be included in the weak, moderate or strong staining percentages, and wherein the sum of all four percentages equals 100; and (ii) inputting the estimated percentages into the formula of 1×(percent of weak staining cells)+2×(percent of moderate staining cells)+3×(percent of strong staining cells), and assigning the result of the formula to the tissue section as the MHS; wherein assigning the MPS comprises estimating, across all of the viable tumor cells and mononuclear inflammatory cells in all of the examined tumor nests, the percentage of cells that have at least partial membrane staining of any intensity, and assigning the resulting percentage to the tissue section as the MPS; and wherein if both the MHS and MPS are assigned, the assignments may be made in either order or simultaneously.

For example, the four categories "no", "weak", "moderate" and "strong" may be defined, for example, as non-overlapping intensity threshold ranges; for example, a cell pixel region may be considered as a cell with "no staining" if the average intensity value is less than 5%, as a cell with "weak staining" if the average intensity value is >5% and <25%, as a cell with "moderate staining" if the average intensity value is >=25% and <75%, and as a cell with "strong staining" if the average intensity value is >=75%.

In yet another aspect of the present disclosure is a method of scoring PD-L1 expression in tumor tissue sections that have been stained with an anti-PD-L1 antibody in an IHC assay. In some embodiments, the scoring results of these scoring processes may be used to select patients for treatment with a PD-1 antagonist, e.g., as enrollment criteria in a clinical trial, to predict response of a subject to a PD-1 antagonist, and in methods of treating a patient for cancer.

In another aspect of the present disclosure is a computer device or system for classifying and/or quantifying cells within an image of a tissue sample comprising one or more processors and at least one memory, the at least one memory storing non-transitory computer-readable instructions for execution by the one or more processors to cause the one or more processors to: detect cells or cell nuclei in the image of the tissue sample, compute nuclear feature metrics, wherein the nuclear feature metrics are derived from features within cell nuclei in the image of the tissue sample; compute contextual information metrics of nuclei of interest within the image of the tissue sample; and classify cells within the image based on the nuclear feature metrics and contextual information metrics. In some embodiments, the tissue sample has been stained for the presence of the PD-L1 biomarker. In some embodiments, the tissue sample has been stained in an IHC assay for the presence of the PD-L1 biomarker, where the assay comprises a chromogenic, chemiluminescent, or fluorescent label and a counterstain. In other embodiments, the IHC assay stains the presence of the PD-L1 biomarker with 3,3'-diaminobenzidine and uses Hematoxylin as a counterstain. In some embodiments, the cells are classified as PD-L1 positive immune cells, PD-L1 positive tumor cells, PD-L1 negative immune cells, PD-L1 negative tumor cells, or other cells (PD-L1 images).

In another aspect of the present disclosure is a computer-implemented method of classifying cells within an image of a tissue sample comprising detecting cells or cell nuclei of interest in the tissue sample image, computing nuclear feature metrics from nuclei within the image based on their appearance and response to the staining assay; computing contextual information metrics from nuclei within the image; and classifying the nuclei within the image using a combination of the nuclear feature metrics and contextual information metrics. The expression "based on their appearance and response to the staining assay" may imply that information on said nuclear features are used as input for calculating a metric feature value. In some embodiments, the nuclear feature metrics and contextual information metrics are computed using a feature extraction module. In some embodiments, the nuclei are classified using a classification module, the classification module using the metrics computed by the feature extraction module. In some embodiments, the tissue sample has been stained for the presence of the PD-L1 biomarker. In some embodiments, the tissue sample has been stained in an MC assay for the presence of the PD-L1 biomarker, where the assay comprising a chromogenic, chemiluminescent, or fluorescent label and a counterstain. In other embodiments, the IHC assay stains the presence of the PD-L1 biomarker with 3,3'-diaminobenzidine and uses Hematoxylin as a counterstain. In some embodiments, the cells are classified as PD-L1 positive immune cells, PD-L1 positive tumor cells, PD-L1 negative immune cells, PD-L1 negative tumor cells, or other cells (PD-L1 images).

Applicants have shown that the presently disclosed method provides superior results as compared to prior art methods. Applicants have performed extensive experimental evaluations to show that contextual information is useful for the classification of the nuclei in PD-L1 stained images when combined with a set of traditional nuclear features. Indeed, the use of contextual information metrics in conjunction with nuclear metrics provides an improvement in nucleus classification accuracy as compared with the prior art, where cells were classified exclusively with nuclear metric features. Applicants have also demonstrated several methods of deriving the contextual information metrics, which when combined with the nuclear feature metrics, provides comparatively superior classification results as compared with the prior art. Applicants have therefore developed a method that allows for automated classification of nuclei in PD-L1 stained tissue images, where the method identifies each nucleus based on its own appearance (nuclear feature metrics) and the appearance of cells in its local tissue context (contextual information metrics). It has been observed that the accuracy for PD-L1 stained tissue images is particularly high, as PD-L1 is also expressed in the cell membrane and intensity information on the region surrounding a nucleus may thus help in accurately classifying cells into PD-L1 positive and PD-L1 negative cells.

BRIEF DESCRIPTION OF THE DRAWING FIGURES

The patent or application file contains at least one drawing executed in color. Copies of this patent or patent application publication with color drawings will be provided to the Office upon request and the payment of the necessary fee.

FIG. 1A illustrates a computer-based system for analyzing specimens in accordance with embodiments of the disclosed technology;

FIG. 1B provides a flowchart showing an overview of the modules used within the computer-based system and method;

FIG. 1C provides a flowchart showing an overview of steps of classifying cells based on nuclear metrics and contextual information metrics;

Figure 6A:
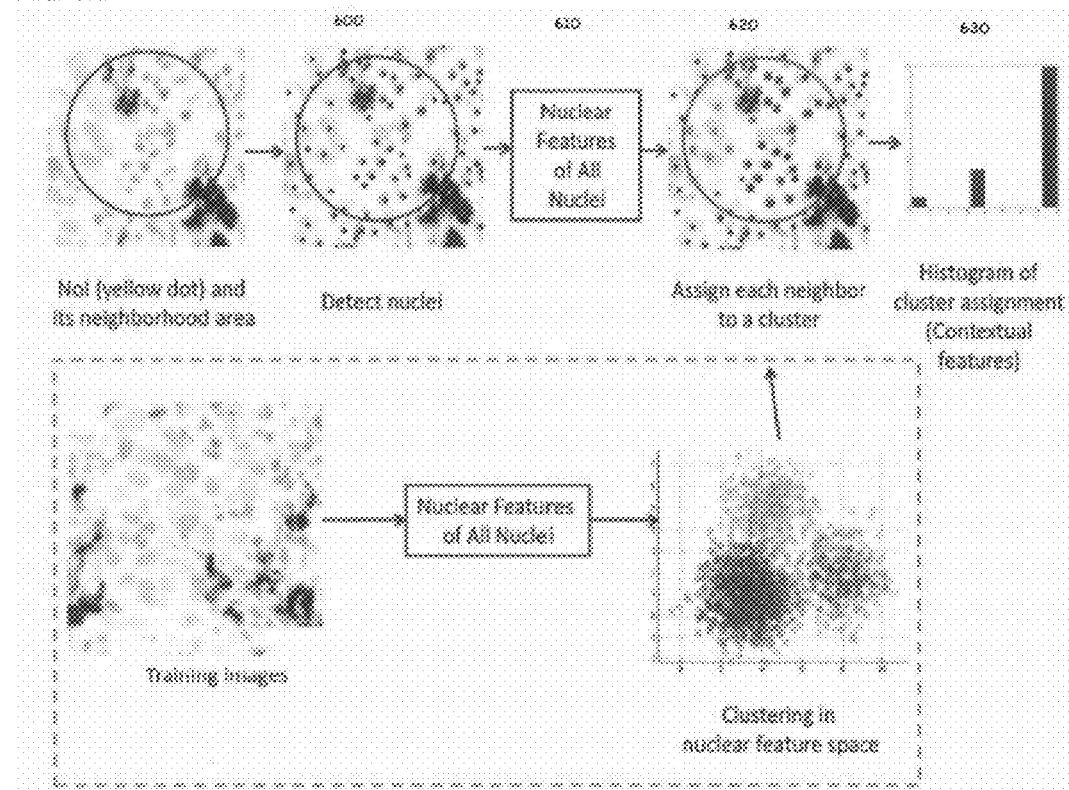
Figure 6B:
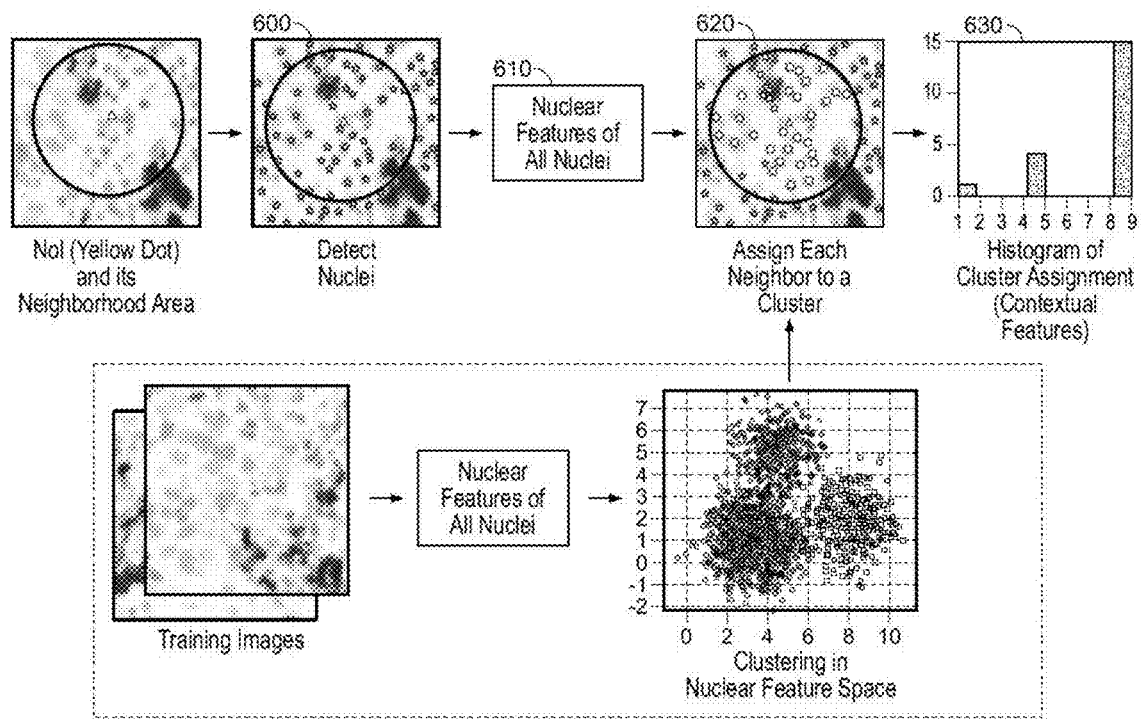
Figure 6C:
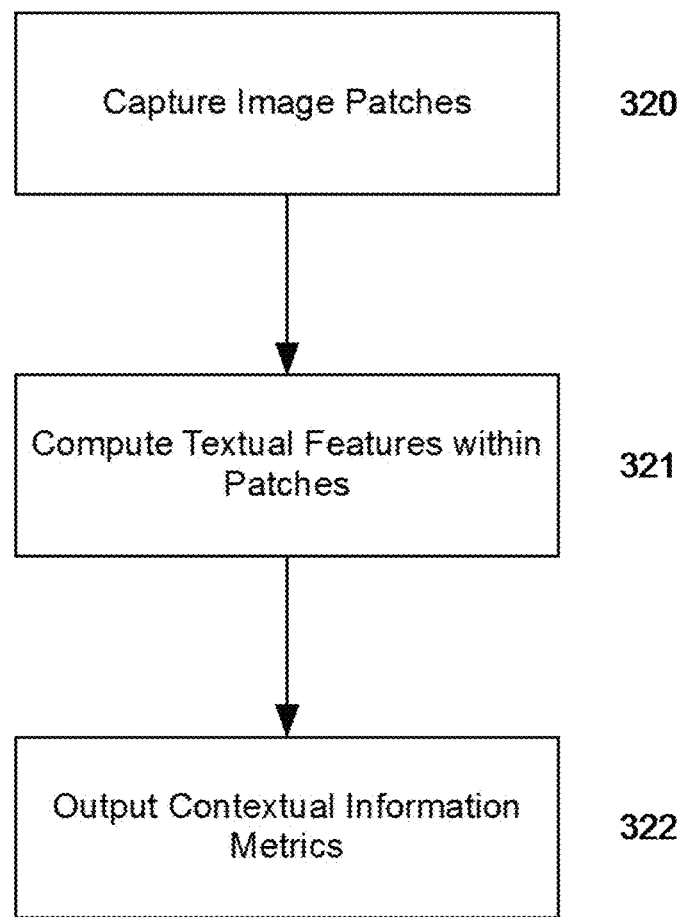
Figure 6D:
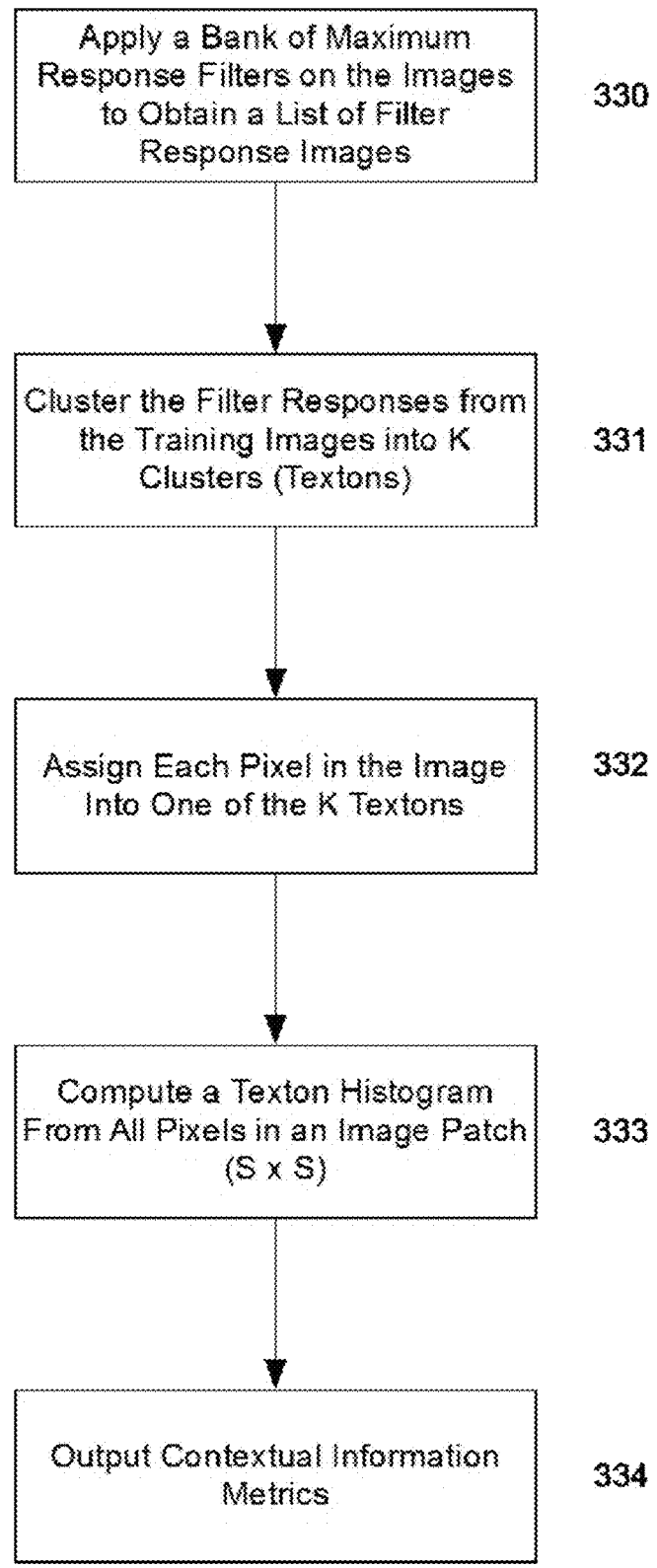
Figure 7A:
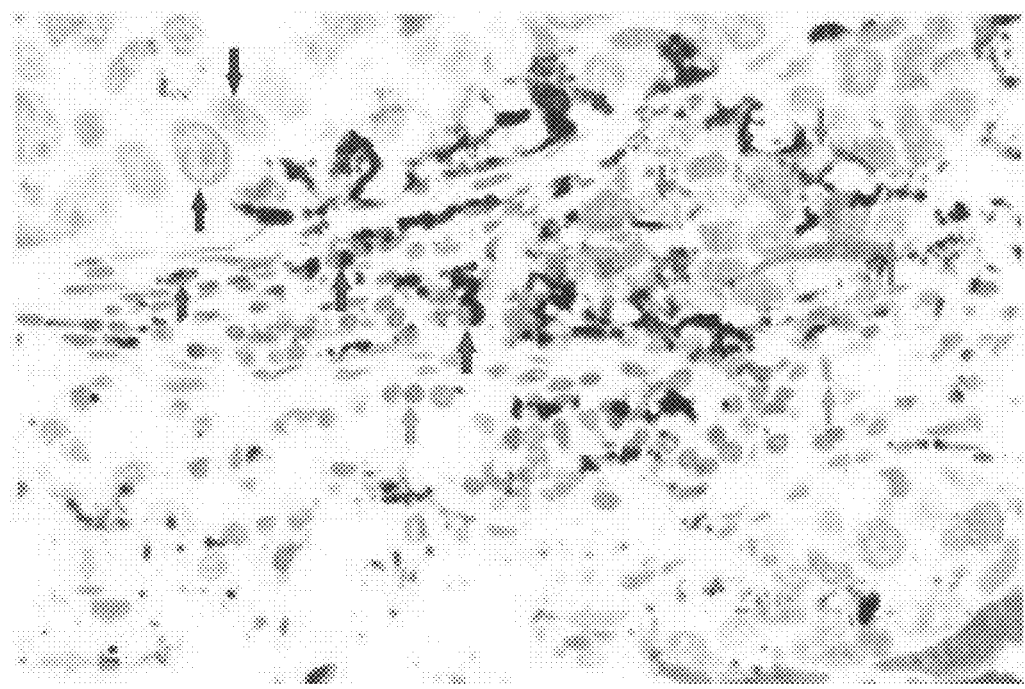
Figure 7B:
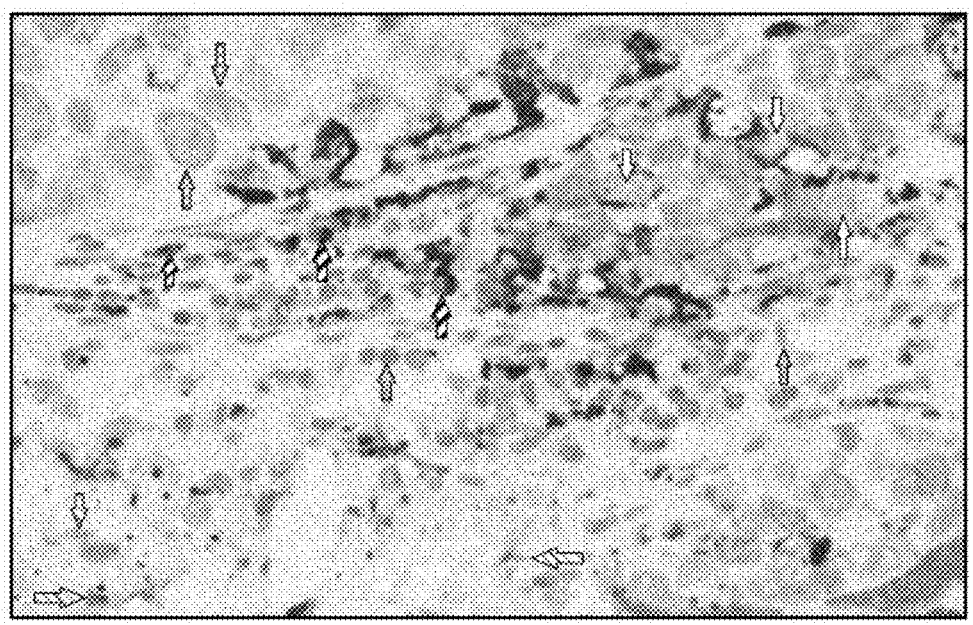
Figure 7B:
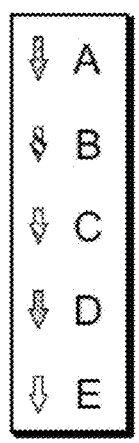
Figure 8:
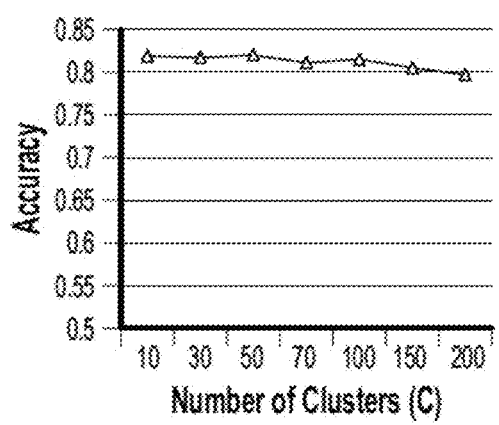
Figure 8:
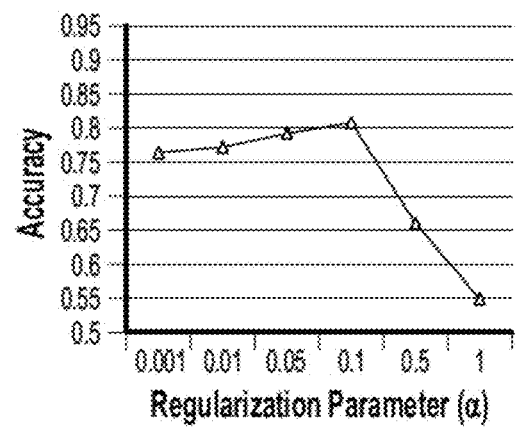
Figure 9:
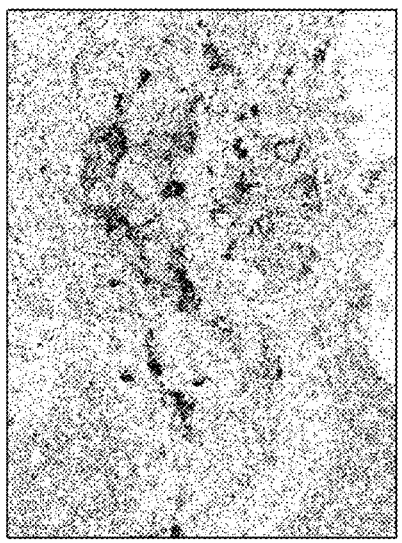
Figure 9:
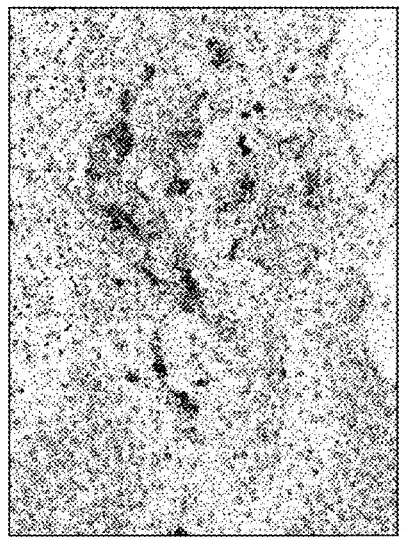
Figure 9:
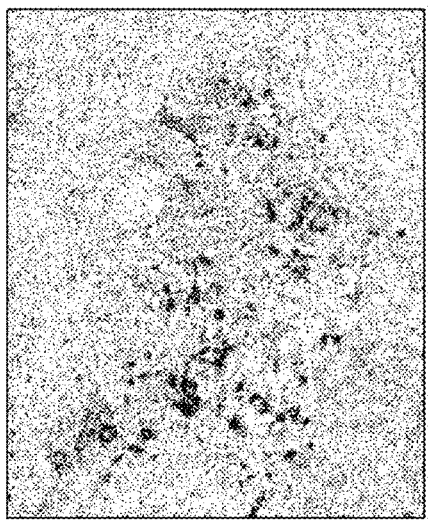
Figure 9:
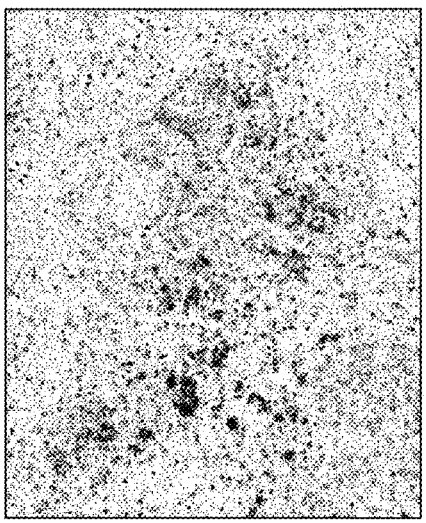
Figure 10:
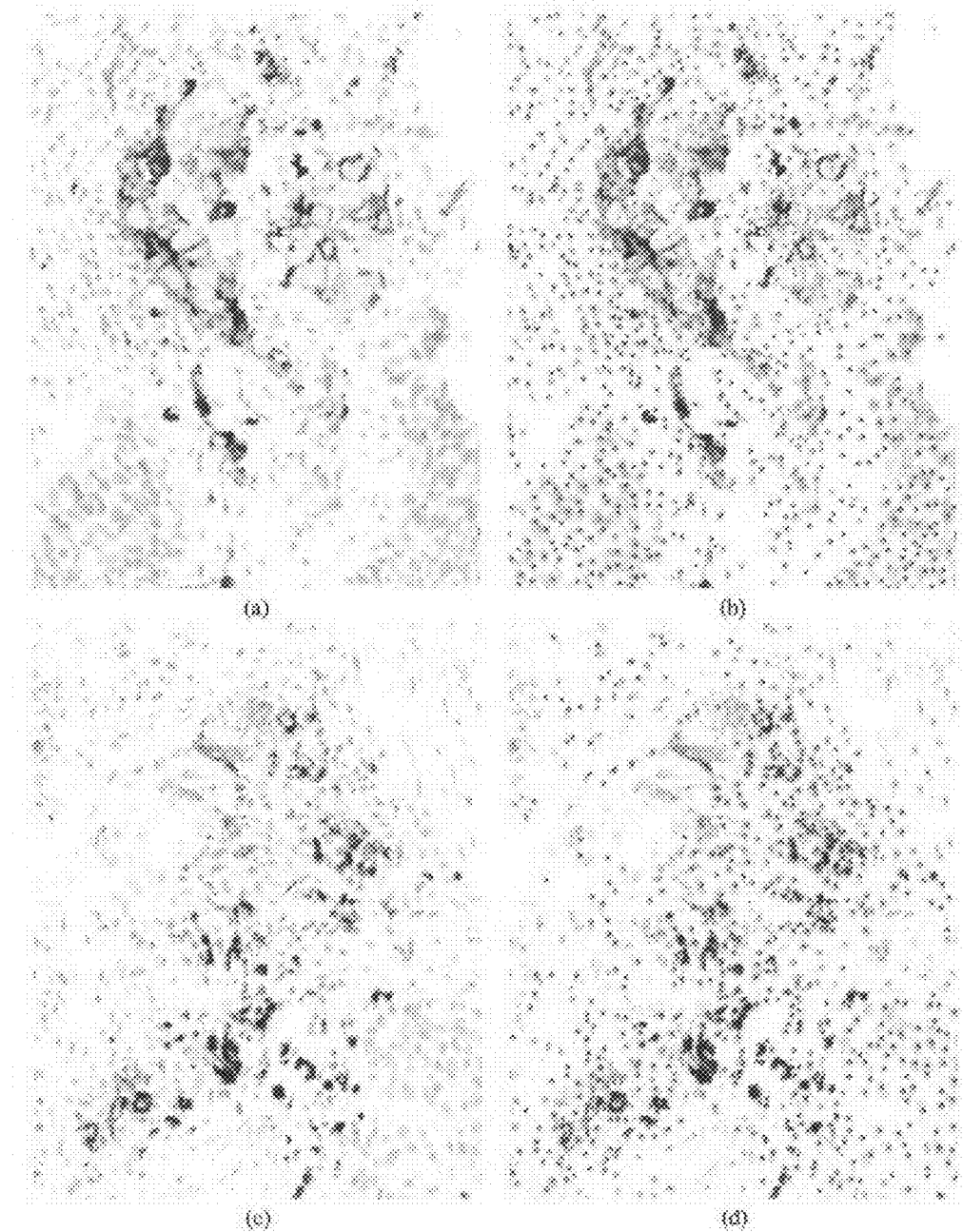

FIGS. 6A and 6B provide a step-wise method of computing textual features using a context "Bag of Words" method;

FIG. 6C provides a flowchart illustrating the steps of deriving contextual information using a context-texture method;

FIG. 6D provides a flowchart illustrating the steps of deriving contextual information using a context-texton method;

FIGS. 7A and 7B show five classes of nuclei in PD-L1 stained lung tissue images;

FIG. 8 shows the accuracies of the context "Bag of Words" and context-CRF methods depending on parameter choices;

FIGS. 9 and 10 show an example of classification results; and

FIGS. 11A, 11B, 11C, and 11D show example results obtained with a proposed scoring method described herein.

DETAILED DESCRIPTION

As used herein, the singular terms "a," "an," and "the" include plural referents unless the context clearly indicates otherwise. Similarly, the word "or" is intended to include "and" unless the context clearly indicates otherwise.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

The present disclosure is directed to the derivation and subsequent use of contextual information metrics to assist in the classification of cells and cell nuclei in tissue images, for example cells and cell nuclei in tissue stained for the presence of the PD-L1 biomarker. The present disclosure sets forth four different methods of deriving contextual information metrics including (1) the application of a conditional random field ("CRF") model on top of nuclear feature metrics ("context-CRF method"); (2) the extraction of additional textural features in image patches centered at nuclei (and combining the textural features with nuclear feature metrics) ("context-texture method"); (3) the computation of a texton histogram in image patches centered at nuclei (and combing the texton histogram feature with nuclear feature metrics) ("context-texton method"); and (4) the use of a "bag of words" model to capture the appearance of the neighboring nuclei (the "bag of words" model clusters the training nuclear features into a number of cluster centers, and assigns the neighbors of each nucleus of interest to these clusters) ("context-BoW method").

Without wishing to be bound by any particular theory, it is believed that the contextual information of a nucleus of interest (i.e. information describing neighboring nuclei or the image texture in a region centered at the nucleus of interest) is useful in classifying the cell nucleus. By way of example, it is believed that a cell nucleus can be more confidently labeled (for example as being a nucleus in a tumor cell) by taking into account the cells and other biological structures in its neighborhood. Indeed, Applicants have shown that consideration of contextual information metrics in conjunction with nuclear feature metrics systematically improves classification accuracy as compared to classifying cells based on nuclear features alone (see, for example, Example 1 and Table 1, herein).

Figure 2A:
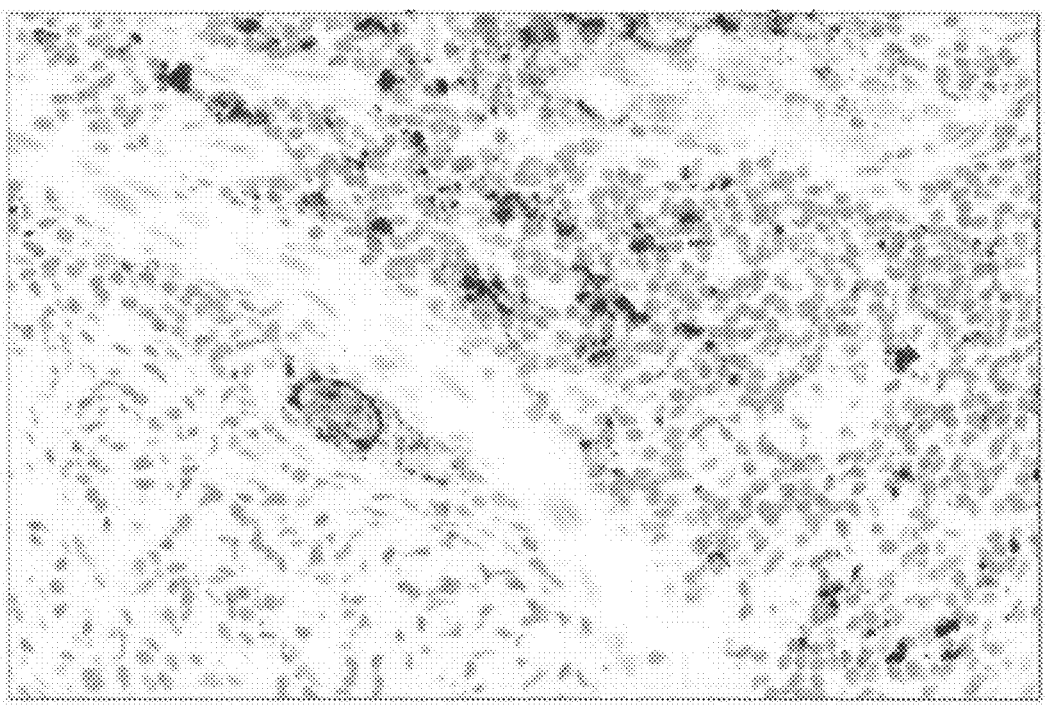
FIGS. 2A and 2B show a field of view from a lung cancer specimen stained with PD-L1.
Figure 2B:
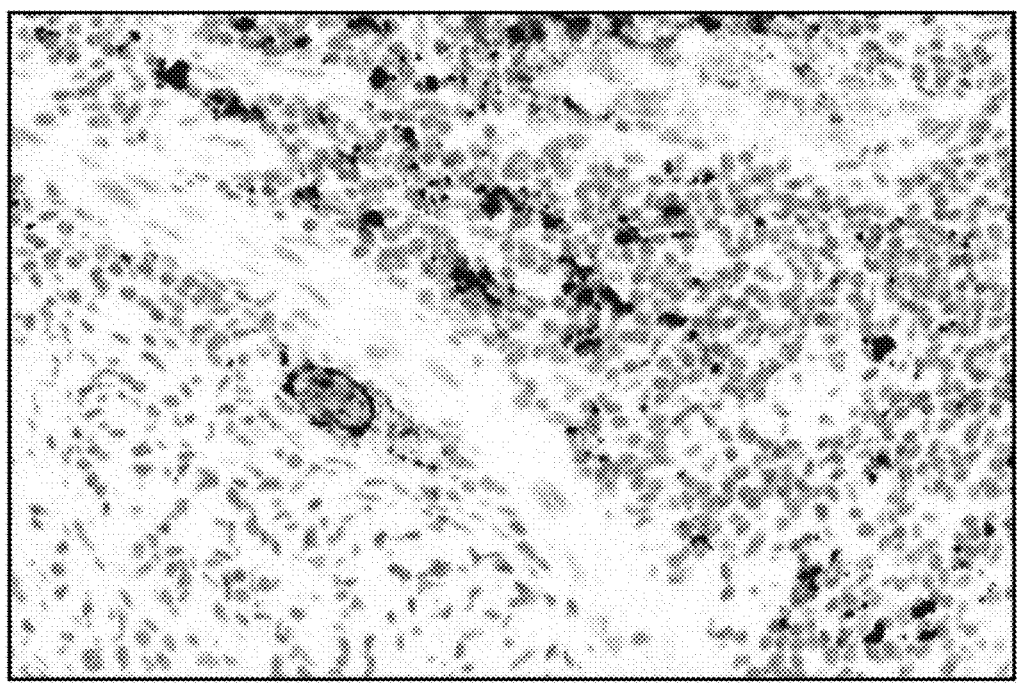

At least some embodiments of the technology disclosed herein relate to computer systems and methods for analyzing digital images captured from tissue samples pretreated with immunohistochemistry (IHC) staining for the PD-L1 biomarker. In some embodiments, the tissue samples under evaluation in the present disclosure have been stained in the presence of the PD-L1 biomarker with DAB, and where Hematoxylin was used as a counterstain (see, for example, FIGS. 2A and 2B, which provide a field of view from a lung cancer specimen stained with PD-L1). In some embodiments, a PD-L1 (SP263) assay is used in conjunction with the VENTANA BenchMark series of advanced staining instruments. Although exemplary embodiments described herein disclose the application of IHC staining for the PD-L1 biomarker, it will be appreciated that the technology can be used to analyze images of tissue samples treated with other probes and/or assays to detect different types of cells and/or image regions in a tissue sample.

IHC is a technique for detecting a peptide of interest in a tissue by contacting a sample of the tissue with an entity that specifically binds to the peptide of interest ("specific binding entity"). In some examples, the specific binding entity is selected from the group consisting of an antibody, an antigen-binding fragment of an antibody, a single chain antibody, Affimers™, and a DARPIN. an affirmers, and a DARPIN. As used herein, the term "peptide" shall encompass any molecule that includes a chain of amino acids linked to one another by peptide bonds, including oligopeptides, polypeptides, and proteins. For example, in some embodiments, IHC relies on the specific binding entity to its corresponding antigen for detection and an enzymatic step where a dye is processed to produce a stain for visualization. Other methods and assays may be substituted by those of skill in the art. By revealing the presence or absence of specific peptides in the observed tissue, IHC helps in determining which cell type is at the origin of a tumor. According to the proteins revealed by IHC, specific therapeutic treatments may also be selected or adapted for the type of cancer detected.

As used herein, the term "antibody" refers to any form of antibody that exhibits the desired biological or binding activity. Thus, it is used in the broadest sense and specifically covers, but is not limited to, monoclonal antibodies (including full length monoclonal antibodies), polyclonal antibodies, multi-specific antibodies (e.g., bi-specific antibodies), humanized, fully human antibodies, chimeric antibodies and camelized single domain antibodies.

As used herein, unless otherwise indicated, "antibody fragment" or "antigen binding fragment" refers to antigen binding fragments of antibodies, i.e. antibody fragments that retain the ability to bind specifically to the antigen bound by the full-length antibody, e.g. fragments that retain one or more CDR regions. Examples of antibody binding fragments include, but are not limited to, Fab, Fab', F(ab')$_2$, and Fv fragments; diabodies; linear antibodies; single-chain antibody molecules, e.g., sc-Fv; nanobodies and multispecific antibodies formed from antibody fragments.

Affimers™ are engineered proteins that mimic the specificity and binding affinities of antibodies, but are much smaller and have a molecular weight of about 14 kDa. They are believed to be highly stable and engineered to display peptide loops which provide a high affinity binding surface for a specific target protein.

DARPins (designed ankyrin repeat proteins) are genetically engineered antibody mimetic proteins typically exhibiting highly specific and high-affinity target protein binding. They are derived from natural ankyrin proteins and consist of at least three, usually four or five repeat motifs of these proteins. Programmed cell death 1 ligand 1 (PD-L1) is a type 1 transmembrane protein involved in the regulation of cellular and humoral immune responses. PD-L1 is mainly expressed in antigen presenting cells, placenta, and some tumors such as melanoma, diffuse large B-cell lymphoma, and carcinoma of the lung, colon, rectum, kidney, as well as other organs. Two rabbit monoclonal anti-human PD-L1 antibodies are commercially available for immunohistochemistry (IHC) application in normal and tumor tissues, namely SP142 (Spring Bioscience, Pleasanton, Calif.) and clone E1L3N (Cell Signaling Technology, Danvers, Mass.). Further IHC assays for detecting PD-L1 in tumor tissue are disclosed in WO2014165422 (PCT/US2014/032305), the disclosure of which is hereby incorporated by reference herein in its entirety.

As used herein, the term "peptide" shall encompass any molecule that includes a chain of amino acids linked to one another by peptide bonds, including oligopeptides, polypeptides, and proteins.

Figure 1A:
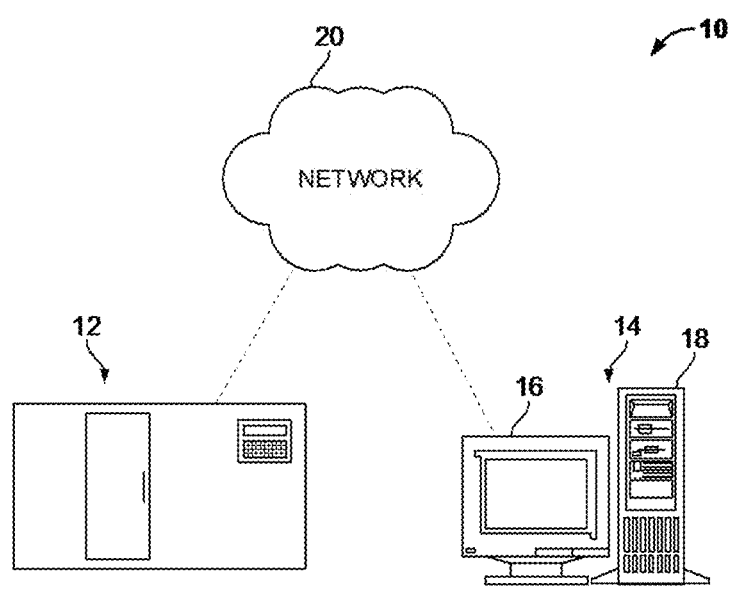

A "sample" or "tissue sample" may be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer) which are suitable for histochemical or cytochemical analysis, such as samples that preserve the morphological characteristics of the cells and/or tissues to be analyzed. For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired. Samples can be prepared using any method known in the art by of one of ordinary skill. The samples can be obtained from a subject for routine screening or from a subject that is suspected of having a disorder, such as a genetic abnormality, infection, or a neoplasia. The described embodiments of the disclosed method can also be applied to samples that do not have genetic abnormalities, diseases, disorders, etc., referred to as "normal" samples. Samples can include multiple targets A computer-based specimen analyzer for analyzing specimens is shown in FIG. 1A. The skilled artisan will appreciate that other computer systems may be utilized and that the computer systems described herein may be communicatively coupled to additional components, e.g. analyzers, scanners, etc. Some of these additional components and the various computers that may be utilized are described further herein. In general, the imaging apparatus 12 can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. A CCD sensor can capture a digital image of the specimen. One method of producing a digital image includes determining a scan area comprising a region of the microscope slide that includes at least a portion of the specimen. The scan area may be divided into a plurality of "snapshots." An image can be produced by combining the individual "snapshots." In some embodiments, the imaging apparatus 12 produces a high-resolution image of the entire specimen, one example for such an apparatus being the VENTANA iScan HT slide scanner from Ventana Medical Systems, Inc. (Tucson, Ariz.).

The computer device 14 can include a desktop computer, a laptop computer, a tablet, or the like and can include digital electronic circuitry, firmware, hardware, memory, a computer storage medium, a computer program, a processor (including a programmed processor), or the like. The illustrated computing system 14 of FIG. 1 is a desktop computer with a screen 16 and a tower 18. The tower 18 can store digital images in binary form. The images can also be divided into a matrix of pixels. The pixels can include a digital value of one or more bits, defined by the bit depth. The network 20 or a direct connection interconnects the imaging apparatus 12 and the computer system 14. The computer systems include one or more processors that are programmed with a series of computer-executable instructions, the instructions being stored in a memory.

Figure 1B:
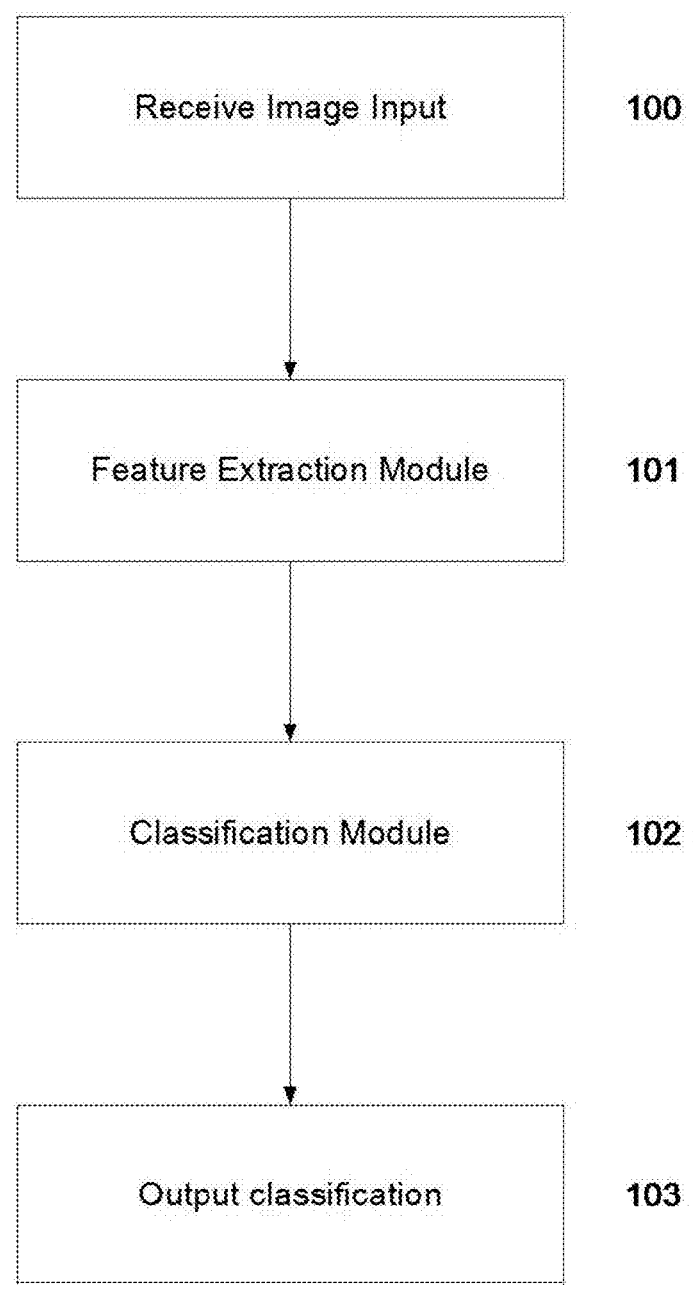
Figure 1C:
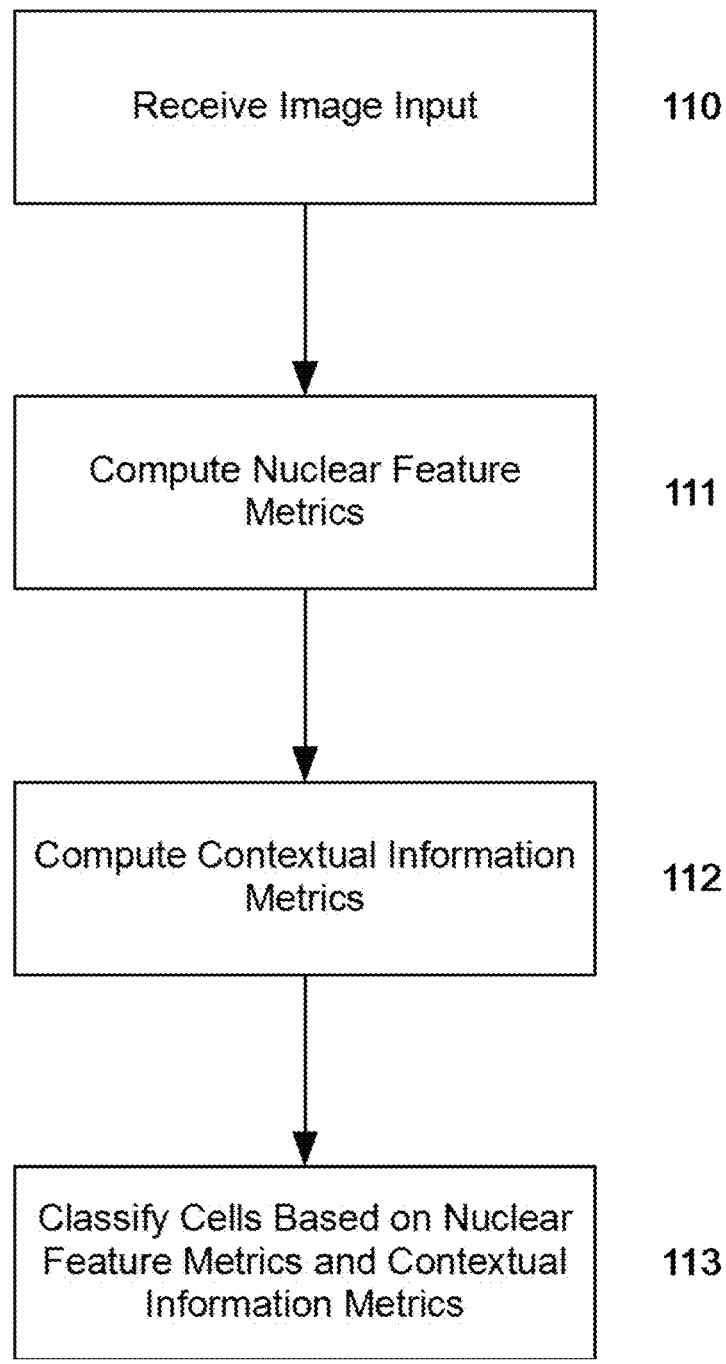

With reference to FIGS. 1B and 1C, when executed, instructions cause at least one of the processors of the computer system to receive an input 100 and 110, such as a digital image of tissue specimen. In some embodiments, the digital image is of a tissue specimen that has been stained for the presence of the PD-L1 biomarker. Once the necessary input is provided, a feature extraction module 101 is then executed to derive nuclear feature metrics 111 and contextual information metrics 112. The nuclear feature metrics and contextual information metrics, once derived, are then provided to a classification module 102 to classify 113 the cell nuclei and provide an output 103 to the user. The output may be to a display, a memory, or any other means suitable in the art.

Feature Extraction Module

In general, the feature extraction module receives image data, derives certain metrics based on the inputted image data (e.g. a vector of metrics), and outputs those metrics to the classification module. As described in more detail herein, the feature extraction module derives nuclear feature metrics (FIG. 1C, step 111) from nuclear features of cells within the input image and also derives contextual information (FIG. 1C, step 112) of a nucleus of interest (NoI), utilizing one of the four methods described herein, from the input image. The various metrics are then supplied to the classification module such that cell nuclei may be classified. Compared with the prior art where nuclear features metrics were alone used for classification, the combination of the nuclear features metrics and contextual information metrics provides for superior classification accuracy (see Example 1).

A "feature metrics" is, for example, a data value having been derived from one or more features. For example, a feature metrics can be a numerical data value being indicative of quantitative properties of a particular feature, a histogram, a distribution, or the like.

The feature extraction module may compute nuclear and contextual information metrics based on one or more image channels and the image channels may be derived by any means known to those of ordinary skill in the art. For example, in some embodiments, the image channels may be derived through color deconvolution or unmixing (i.e. a color deconvolution scheme may be used to transform each image from a RGB color space to a new space modeled by the spectral properties of the stains utilized). Unmixing is described, for example, in 'Zimmermann "Spectral Imaging and Linear Unmixing in Light Microscopy" Adv Biochem Engin/Biotechnol (2005) 95:245-265' and in in C. L. Lawson and R. J. Hanson, "Solving least squares Problems", PrenticeHall, 1974, Chapter 23, p. 161,' the disclosures of which are incorporated herein by reference in their entirety. Indeed, an input image may be unmixed so as to provide image channels that represent the local staining intensity for the stains and labels within the tissue sample. The different channels highlight different tissue structures in the tissue image and that by looking to these individual channels, the appearance of a cell's nucleus and membrane staining may be assessed together with multiple cells, the appearance of those cells, and the staining pattern in a local neighborhood of those cells.

In some embodiments, the image channels selected are based on the assays utilized (e.g. a primary stain channel, an IHC stain channel, or a counterstain channel, a stain channel indicative of PDL1). Of course, different channels may be used for different assays. In the context of PD-L1 biomarker staining, in some embodiments, the channels from which the various features may be derived are the Hematoxylin, luminance, and DAB channels, and again depend on the particular assay employed. In some embodiments, an image of the tissue sample may be unmixed such as to provide image channels that represent the local staining intensity for the stains and labels on the slide, one example being a Hematoxylin channel and DAB channel. In some embodiments, the luminance channel is based on the L component of the L*a*b color space (where in the L*a*b color space, the "L" channel represents the brightness of a pixel, the "A" channel reflects the red and green components of a pixel, and the "B" channel represents the blue and yellow components of a pixel).

Nuclear Features

A "nuclear feature" can be, for example, a feature of a cell nucleus or a feature of a cell which comprises said nucleus, the nucleus or cell having been identified in the image of the tissue sample.

Nuclear feature metrics are first computed for each cell or cell nucleus based on their visual properties and descriptors, e.g. morphology features, appearance features, and background features, each described below.

A "morphology feature" as used herein is, for example, a feature being indicative of the shape or dimensions of a nucleus or of a cell comprising the nucleus. For example, a morphology feature may be computed by applying various image analysis algorithms on pixels contained in or surrounding a nuclear blob.

An "appearance feature" as used herein is, for example, a feature having been computed for a particular nucleus by comparing pixel intensity values of pixels contained in or surrounding a nuclear blob used for identifying the nucleus, whereby the compared pixel intensities are derived from different image channels (e.g. a background channel, a channel for the staining of the PD-L1 biomarker, etc).

A "background feature" is, for example, a feature being indicative of the appearance and/or stain presence in cytoplasm and cell membrane features of the cell comprising the nucleus for which the background feature was extracted from the image. A background feature and a corresponding metrics can be computed for a nucleus and a corresponding cell depicted in a digital image e.g. by identifying a nuclear blob representing the nucleus; analyzing a pixel area (e.g. a ribbon of 20 pixels—about 9 microns—thickness around the nuclear blob boundary) directly adjacent to the identified set of cells are computed in, therefore capturing appearance and stain presence in cytoplasm and membrane of the cell with this nucleus together with areas directly adjacent to the cell.

Of course, other features, as known to those of ordinary skill in the art, may be considered and used as the basis for computation of nuclear feature metrics. It is believed that the nuclear features may capture the occurrence, density, and other like properties of biological objects, including nuclei, cells, etc. in the tissue sample and the detection of these objects allows for the derivation of metrics for use in classification (alone as in the prior art; or here in combination with contextual information metrics). The various nuclear feature metrics computed from these nuclear features are provided as a vector of nuclear feature metrics and supplied to a classification module along with contextual information metrics.

In some embodiments, the digital images received as input are pre-processed such as to detect nucleus centers and/or to segment the nuclei. For example, instructions may be provided to detect nucleus centers based on radial-symmetry voting using techniques commonly known to those of ordinary skill in the art (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein).

The nuclei are then subsequently segmented using thresholds individually computed for each nucleus. For example, Otsu's method may be used for segmentation in a region around the nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

Nuclear feature metrics are then derived from features extracted from the nuclei of the cells in the tissue sample. The computation of nuclear feature metrics are well known in the art and any nuclear features known may be used in the context of the present disclosure. Non-limiting examples of metrics that may be computed include:

Metrics Derived from Morphology Features: (area, minor, and major axis lengths, perimeter, radius, and solidity) [Area=total number of pixels in the nucleus region; Minor/MajorAxisLength: Scalar specifying the length (in pixels) of the minor/major axis of the ellipse that has the same normalized second central moments as the region; Perimeter: Number of pixels on the boundary of the nuclei regions; Radius: Average distance from the center of the nucleus to the boundary pixels of the nucleus; Solidity: Scalar specifying the proportion of the pixels in the convex hull that are also in the region (Computed as Area/ConvexArea)].

Metrics Derived from Appearance Features: percentile values (e.g. the 10th, 50th, and 95th percentile values) of pixel intensities and of gradient magnitudes computed from different image channels. For example, at first, a number P of X-percentile values (X=10, 50, 95) of pixel values of each of a plurality IC of image channels (e.g. three channels: HTX, DAB, luminance) within a nuclear blob representing the nucleus of interest are identified. Therefore, P×IC feature values are computed for a particular nucleus of interest represented by said nuclear blob, whereby P indicates the number of percentile values examined and IC represents the number of image channels from which the feature values are computed. In this example, 3*3 feature values acting as "nuclear feature metrics" are computed for the NoI.

In addition, the same X-percentile values of pixel values of the same number and type of image channels within a ribbon of pixels surrounding the nuclear blob representing the NoI are identified, creating P×IC feature values (here: 3*3=9 feature values) acting as "contextual information metrics" are computed for the NoI. Finally, the P×IC (here: 9) nuclear feature metrics and the P×IC (here: nine) contextual information metrics are combined, e.g. in a combined feature vector comprising 2×P×IC (here: 9+9=18) feature metrics which are used as the appearance features of the nucleus of interest. Computing appearance feature metrics may be advantageous as said metrics may describe the properties of the nuclear regions (e.g., dark brown nuclei, dark blue nuclei, light blue nuclei, etc) as well as describe the membrane region (the ribbon region) around the nuclei, e.g., if the membrane stain are light brown, dark brown or no staining at all, etc.

In the context of IHC staining for PD-L1 biomarkers, the image channels are Hematoxylin, luminance (LAB color space), and DAB in the segmented nuclei. The local image intensities required to determine appearance features may be computed by any method known to those of ordinary skill in the art including that disclosed by "Ruifrok, Arnout C., and Dennis A. Johnston. "Quantification of histochemical staining by color deconvolution." Analytical and quantitative cytology and histology/the International Academy of Cytology [and] American Society of Cytology 23.4 (2001): 291-299," the disclosure of which is incorporated by reference in its entirety.

Metrics Derived from Background Features: These metrics are similar to the nuclear appearance features, but are computed in a ribbon of 20 pixels (about 9 microns) thickness around each nucleus boundary, therefore capturing appearance and stain presence in cytoplasm and membrane of the cell with this nucleus together with areas directly adjacent to the cell. This size is chosen because it captures a sufficient amount of background tissue area around the nuclei that can be used to provide useful information for nuclei discrimination. These features are similar to those disclosed by "J. Kong, et al., "A comprehensive framework for classification of nuclei in digital microscopy imaging: An application to diffuse gliomas," in ISBI, 2011, pp. 2128-2131" the disclosure of which is incorporated by reference in its entirety herein. It is believed that these features may be used to determine whether the surrounding tissue is stroma or epithelium. Without wishing to be bound by any particular theory, it is believed that these background features also capture membrane staining patterns since the PD-L1 biomarker mostly stains the cell membrane and creates a brown ribbon, brown spots, or both along the outside of the nucleus boundaries.

Contextual Information

Figure 3A:
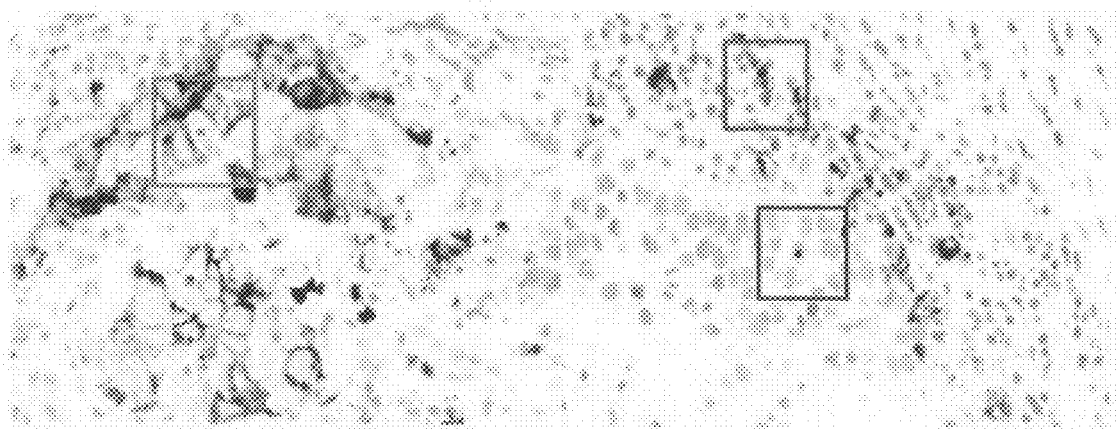
FIGS. 3A and 3B show neighborhood regions of different nuclei of interest denoted by rectangular dots.
Figure 3B:
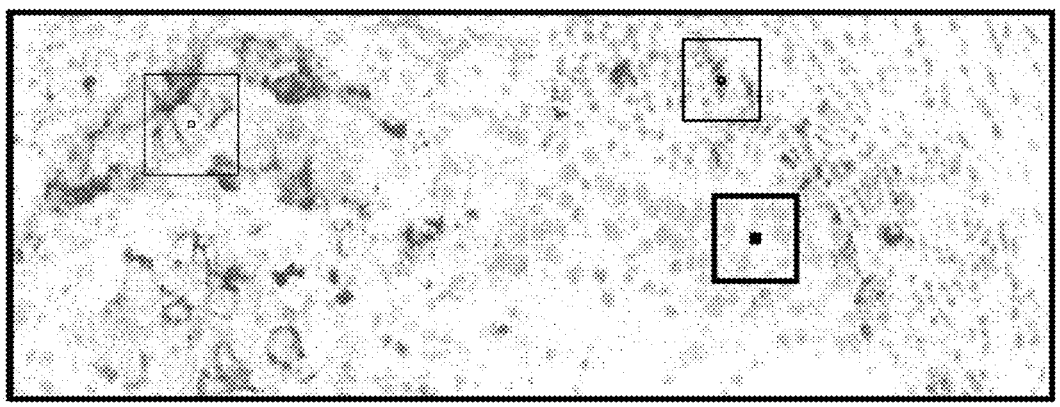

After the nuclear feature metrics are computed, contextual information metrics are derived for each nucleus of interest (NoI). It is believed that the contextual information of a NoI, i.e. information describing neighboring nuclei or the image texture in a region centered at the NoI, provides useful evidence to predict its label. For example, it is believed that a nucleus may be more confidently labeled as tumor provided that neighboring nuclei also belong to tumor tissue. Likewise, it is believed that a nucleus may be more confidently labeled as tumor provided that the textual pattern of an area surrounding the nucleus is similar to that found in a tumor region. This is illustrated in FIGS. 3A and 3B which shows neighborhood regions of different NOIs (denoted by rectangular dots). Red (medium line width), green (light line width), and blue (heavy line width) rectangles indicate the neighborhood regions of PD-L1 positive immune cell nuclei, PD-L1 positive tumor cell nuclei, and PD-L1 negative tumor cell nuclei, respectively. From at least the example provided within FIGS. 3A and 3B, it is evident that the textural information and nuclei information in the denoted neighborhood regions are different from each other and it is this type of contextual information that, when considered together with the nuclear feature metrics, allows for the superior classification results obtained.

Contextual information may be derived by any method known to those of skill in the art. In some embodiments, the contextual information is derived from at least one of (1) a context-texture method; (2) a context-texton method; (3) a context-CRF method; and (4) a context-Bag of Words (BoW) method. In some embodiments, the contextual information requires the computation of additional features from all image pixels in a neighborhood of each nucleus (see, for example, the Context-Texture Method and the Context-Texton Method herein). In other embodiments, the contextual information metrics are pre-computed and no additional features need to be computed to evaluate the context information of a particular neighbor nucleus. Rather, the pre-computed nuclear features and labels are utilized from neighboring nuclei. For example, the pre-computation of nuclear features and contextual information metrics may be performed once for all nuclei identified within the image or within a region of interest in said image.

Context-Texture Method

The context-texture method is used to compute a set of textural features from an image patch centered at each NoI. More specifically, the context-texture method allows the textual pattern in a region around each NoI to be captured and this information is used to assist in the identification of the local type of tissue in which the NoI may be lying (e.g. regions around any NoI may include solid tumor, aggregates of lymphocytes (immune cells), stroma, and/or overall staining responses). For example, stroma is characterized by a fiber-like texture, while the presence of multiple "blobs" of varying size is characteristic of a tumor region. By computing the textural features in image patches of a region surrounding the fiber-like textures or blobs, the information could assist in classifying any cell or cell nucleus in the region as belonging to stroma, as opposed to tumor tissue, or vice-versa.

In the context of PD-L1-stained tissue, regions with lymphocytes that do not express the PD-L1 biomarker ("negative lymphocytes") are characterized by small blue blobs; regions with lymphocytes that do express the PD-L1 biomarker ("positive lymphocytes") are characterized by small blue blobs and brown blobs; tumor regions with cells predominantly expressing the PD-L1 biomarker ("positive tumor cells") are characterized by large blue blobs and brown rings; and tumor regions where cells do not express the PD-L1 biomarker ("negative tumor cells") are characterized by large blue blobs only.

In general, and with reference to FIG. 6C, the context-texture method is performed by capturing images patches centered at each NoI (step 320). In some embodiments, a patch size having a size S×S is selected which captures a reasonably large tissue area that provides rich contextual information about the nucleus. In other embodiments, the patch size ranges from between about 50 pixels to about 200 pixels in any S×S dimension. In yet other embodiments, a patch size of about 150 pixels (about 70 microns) is used.

After the image patch is captured (step 320), textural features are computed within each patch (step 321). In some embodiments, the textural features computed include features such as histogram of intensities, histogram of gradient magnitude and gradient orientation, Gabor features, and Haralick features, each of which are described further herein. The textural features computed are outputted as contextual information metrics (step 322) to the classification module.

In some embodiments, the image is partitioned into a grid of patches. The distribution of patches may be implemented in a number of different ways. For example, the patches may be circular or rectangular. In some embodiments, the patches overlap. In other embodiments, the distances between the centers of a patch (radius) can be the same or different. For example, each patch of the grid of patches may comprise one or more nuclei which may be located at any position within the patch. If one of said nuclei is used as the NoI, the patch comprising said nuclei defines the area within which all other nuclei contained in said patch are considered as neighbor nuclei of the NoI. Thus, a patch defining the neighborhood of a nuclei may be centered around the NoI in some embodiments but may also be centered e.g. around grid points of a grid of patches. Of course, the skilled artisan will recognize that any grid of patches may be assembled using any of these variables provided. To do this, a grid of points is distributed uniformly in the image (with a fixed interval distance between the points). At each point, a rectangular (or circular) region centered at the point is created, which is called a patch. The effect of size and shape of the patch need to be evaluated by experiments. In general, and without wishing to be bound by any particular theory, it is believed that a very small patch does not provide enough information to assign a biologically meaningful label. On the other hand, and without wishing to be bound by any particular theory, it is believed that a large patches require long computation times and, moreover, may contain more than one tissue type, which is detrimental to the method. Hence, patch sizes are chosen for each analysis problem to reflect the tissue properties at hand.

In some embodiments, the patches generated are in the form of "superpixels." Superpixels are sub-areas of an image covering multiple adjacent pixels. "Superpixels" divide the image into non-intersecting image patches with a freeform shape. In some embodiments, the shape may be chosen such that each superpixel meets a target size range and contains predominantly tissue or cells of one type. Superpixels may be generated by many methods including "graph-based algorithms," "gradient-ascent-based algorithms," a SLIC algorithm, mean shift, and normalized cuts. Thus, according to embodiments, a superpixel-generation procedure may be applied on the image for generating the patches, each patch being a superpixel.

Graph-based approaches to superpixel generation treat each pixel as a node in a graph. In some embodiments, edge weights between two nodes are proportional to the similarity between neighboring pixels. On the other hand, gradient ascent based algorithms create superpixels by minimizing a cost function defined over the graph. Starting from a rough initial clustering of pixels, the gradient ascent method iteratively refines the clusters until some convergence criterion is met to form superpixels.

According to embodiments, simple linear iterative clustering is used in order to identify adjacent pixel sets to be used as the "patches" (i.e., superpixels). Simple linear iterative clustering (SLIC) is an adaptation of k-means for superpixel generation, with two important distinctions: (i) the number of distance calculations in the optimization is dramatically reduced by limiting the search space to a region proportional to the superpixel size (this is believed to reduce the complexity to be linear in the number of pixels N—and independent of the number of superpixels k); and (ii) a weighted distance measure combines color and spatial proximity while simultaneously providing control over the size and compactness of the superpixels. (See Achanta, et al., "SLIC Superpixels Compared to State-of-the-Art Superpixel Methods," IEEE Transactions on Pattern Analysis and Machine Intelligence, Vol. 34, No. 11, November 2012, the disclosure of which is hereby incorporated by reference in its entirety herein). For example, the region proportional to the superpixel size may be identical to a predefined upper limit of the super pixel area used for identifying the superpixels. An upper size limit of a superpixel can be, for example, 10000 pixels.

The weight of the combination between color and spatial proximity can be set, for example, to 0.2. These parameters have been observed to provide a particularly high validation accuracy during the training phase.

Figure 4A:
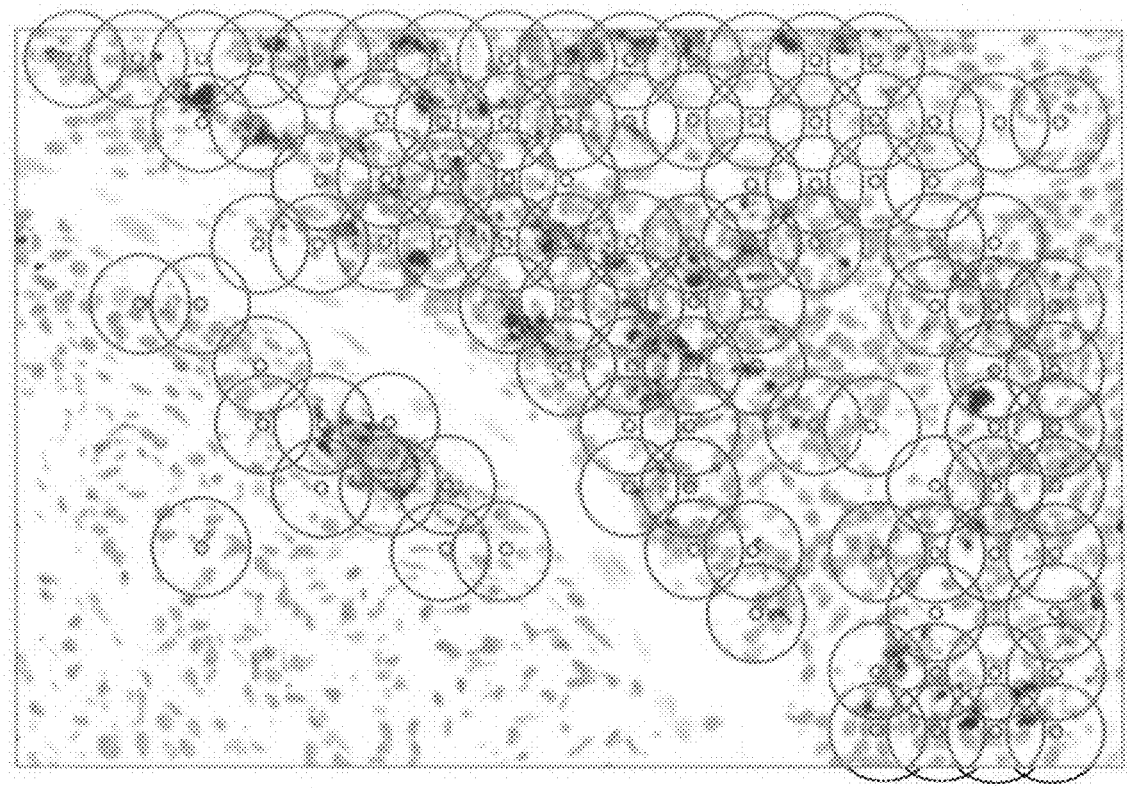
FIGS. 4A and 4B show an example of image patches, where circular overlapping patches are created only for regions positive for PD-L1.
Figure 4B:
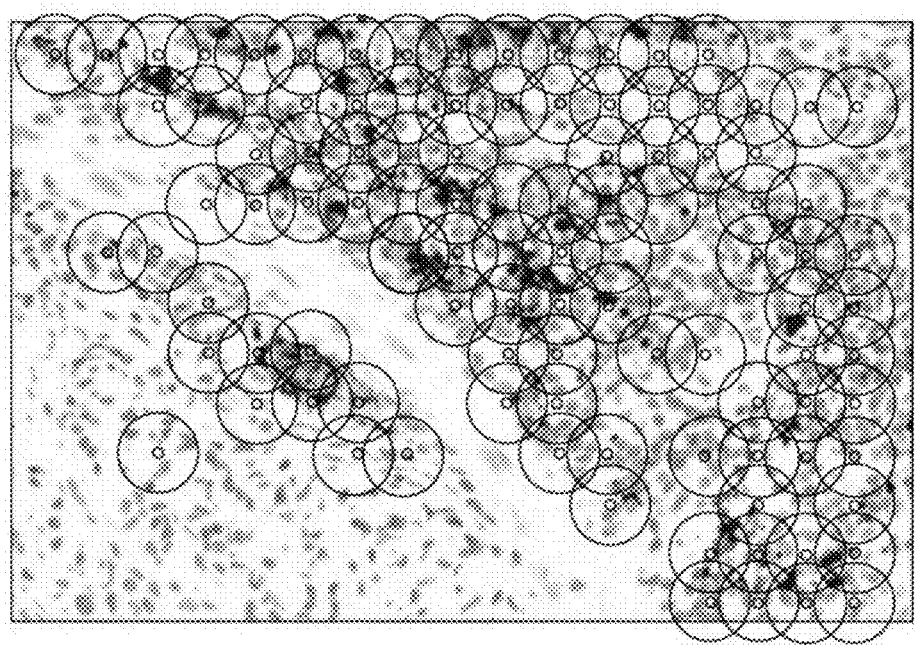
Figure 5A:
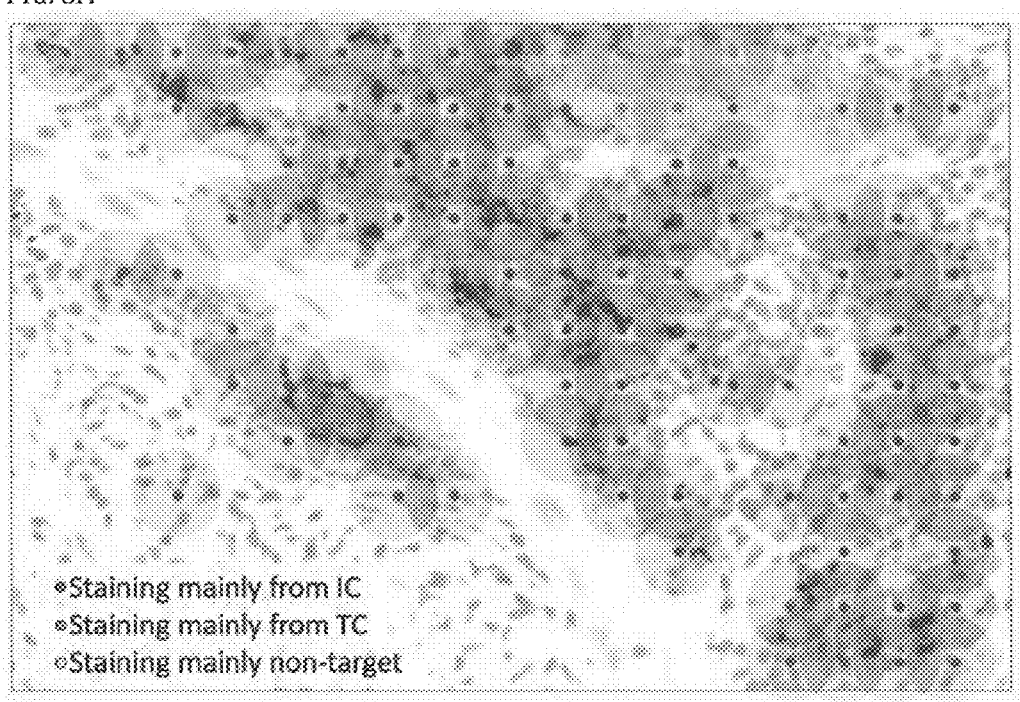
FIG. 5A shows a patch classification result, where red denotes staining mainly from immune cells (IC), green denotes staining mainly from tumor cells (TC), and yellow denotes staining mainly from non-target.
Figure 5B:
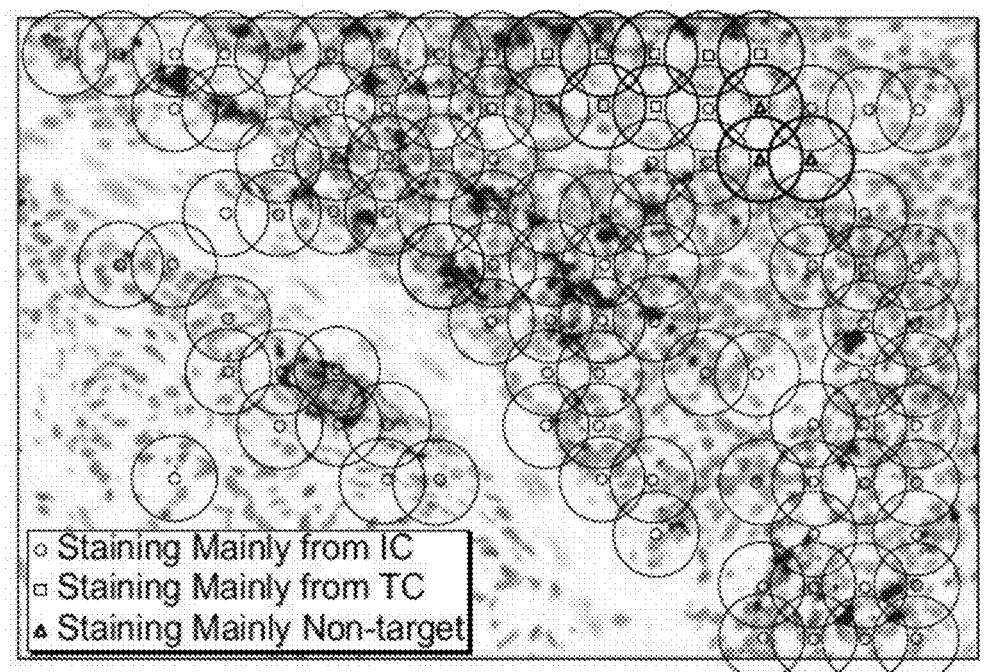
FIG. 5B shows a patch classification result, where circles denote staining mainly from immune cells (IC), squares denotes staining mainly from tumor cells (TC), and yellow denotes staining mainly from non-target.

It is believed that context features (or "contextual information metrics") assigned to each nucleus can include either a single tissue type class or the probability of the surrounding tissue to belong to a list of possible tissue types. In some embodiments, patches are created only for a specific tissue type. For example, patches may be created only for regions positive for a biomarker such as PD-L1, such as shown in FIGS. 4A and 4B. In addition, FIGS. 5A and 5B show a patch classification result, where areas with PD-L1 staining mainly from immune cells are shown in red (or circles), areas with staining PD-L1 staining mainly from tumor cells is shown in green (or squares), and non-target PD-L1 staining is shown in yellow (or triangles), respectively. Assuming a nucleus $n_i$ belongs to a patch $p_i$ and assuming that the patch pi is classified as a patch from a homogeneous region of a tissue mainly comprising cells of a particular cell type, e.g. from an immune cell region, the features of the nucleus ni include [Nuclear features of ni+patch label information (patch from said particular cell type–e.g. immune cell–region)]. Thus, a patch (or "superpixel") can be assigned only one of a set of predefined or learned cell types. However, this does not preclude that a patch may comprise nuclei of cells of a different cell type. However, the probability of a nucleus being contained in a cell of a particular cell type may be decreased where the patch comprising the nucleus has assigned a different cell type.

Independent of the patch creation methods, contextual information metrics are context texture features derived from the patch regions or superpixels. In some embodiments, the texture features are derived from the different images channels (hematoxylin, luminance, and DAB) and include histogram of intensities, histogram of gradient magnitude and gradient orientation, Gabor features, and Haralick features.

In some embodiments, the textural features are computed from different image channels. For example, the different image channels may be based on the stains or counterstains used in preparing the tissue samples (e.g. the hematoxylin, luminance, IHC channels, PDL1 stain channels). In some embodiments, the differences in signals from the different image channels are captured to compute intensity-based features which may be helpful in describing tissue structures. This is achieved by "binning" the range of values, i.e. the entire range of values (intensities) is divided into a series of small intervals—and then how many values fall into each interval is counted. Thus, an "intensity-based feature" may be a binned intensity value of a pixel or a set of pixels. These features may be supplied to the classification module. In other embodiments, gradient features are determined by computing the gradient magnitude and gradient orientation of the image. In some embodiments, the gradient features include a histogram of gradient magnitude and/or a histogram of the gradient vector orientation. For example, the gradient features may include a 10-bin histogram of gradient magnitude, and a 10-bin histogram of the gradient vector orientation. These features are computed, for example, selectively for pixels within a patch, wherein the patch can be identified e.g. by a superpixel generation algorithm. It is believed that these features may differentiate homogeneous from inhomogeneous regions, and differentiate regions with similarly oriented edges from regions with randomly oriented edges. The calculation of histogram is similar to the above with regard to the "binning" of a range of values. In addition to a histogram, in some embodiments, different descriptive statistics like mean, standard deviation, curtosis, percentiles, etc. may be derived as features of the gradient magnitude and gradient orientation. These features may be supplied to the classification module.

In other embodiments, metrics are computed based on textural features extracted by application of a Gabor filter. A "Garbor feature" is, for example, a feature of a digital image having been extracted from the digital image by applying one or more Gabor filters on the digital image. The one or more Garbor filters may have different frequencies and/or orientations. A Gabor filter is, for example, a linear filter that can be used for detecting patterns in images, e.g. for detecting edges. Frequency and orientation representations of Gabor filters are similar to those of the human visual system, and they have been found to be particularly appropriate for texture representation and discrimination. Gabor filters are linear filters often used in image analysis, e.g. for edge detection. For example, a Gabor filter can be a Gaussian kernel function modulated by a sinusoidal plane wave.

It is believed that Gabor filters have the ability to model the frequency and orientation sensitivity characteristic of the human visual system. The Gabor filter convolves the image with log-Gabor filters in a plurality of different orientations and at different scales and then averages the responses of the different orientations at the same scale to obtain rotation-invariant features. A response of a Gabor filter is the result of applying a Gabor filter on intensity values of a set of image pixels. A response calculated for pixels of an image patch comprising a NoI may be used as contextual information metrics of the NoI. In some embodiments, the Gabor filter is used to calculate the average, standard deviation, minimum-to-maximum ratio on the average responses, which may be used as contextual information metrics. More information on Gabor filters and their application may be found in "Jain, A. K., Farrokhnia, F.: "Unsupervised texture segmentation using Gabor filters." IEEE Int. Conf. System, Man., Cyber., pp. 14-19 (1990)," the disclosure of which is hereby incorporated by reference in its entirety herein. Again, these features may be supplied to the classification module.

In yet other embodiments, the contextual information metrics include Haralick features.

Haralick features are believed to capture information about the patterns that emerge in patterns of texture. The Haralick texture values are computed with a co-occurrence matrix. This matrix is a function of both the angular relationship and distance between two pixels (that may be separated from each other by some distance) and shows the number of occurrences of the relationship between two specified pixels. A "Haralick texture feature" or "Haralick feature" is, for example, a feature of a digital image having been extracted from a co-occurrence matrix, which contains information about how image intensities in pixels of the digital image with a certain position in relation to each other occur together. To calculate the Haralick features, the co-occurrence matrix can, for example, be normalized by basing the intensity levels of the matrix on the maximum and minimum intensity observed within each object identified in the digital image.

Haralick, Shanmugan, and Dinstein (1973) refer to this as a "gray-tone spatial-dependence matrix." Their implementation that is used in some embodiments considers four directions (0°, 45°, 90°, and 135°) between pixels that are separated by some distance, d. (See Haralick, R., Shanmugan, K., and Dinstein, I. "Textural Features for Image Classification." IEEE Transactions on Systems, Man, and Cybernetics 3, no. 6 (1973): 610-621, the disclosure of which is incorporated herein by reference in its entirety).

According to embodiments, a co-occurrence matrix (i.e., a spatial dependency co-occurrence matrix) is computed for pixels in the patch centered at the NoI. According to embodiments, a co-occurrence matrix is computed for each of a plurality of predefined directions (or "angles"), e.g. for the four directions 0°, 45°, 90°, and 135°.

From the generated co-occurrence matrix or co-occurrence matrices, a plurality of features may be calculated including autocorrelation, contrast, correlation, dissimilarity, energy, entropy, homogeneity, maximum probability, variance, sum average, sum variance, Sum entropy, difference variance, difference entropy, two information measures of correlation, inverse difference, normalized inverse difference, and inverse moment. Each of the parameters may represent a relation between different data entries in the co-occurrence matrix, e.g. the correlation of the feature "high intensity value in the brown color channel" and a particular bin value for grey value gradient size. Extracting these values from each channel under consideration and taking the mean, standard deviation, and mode of each feature image yields a significant number of co-occurrence features. Any of these features may be used as contextual information metrics.

Calculating the co-occurrence matrix for the pixels in the patch may be advantageous, as the co-occurrence matrix may indicate biological information that may be an indicator of a particular cell type or tissue type. For example, the co-occurring matrix and contextual information metrics derived therefrom may describe how often a blue pixel (pixels within the nuclei) is close to (within a distance d) a brown pixel (pixel of the membrane staining).

According to some embodiments, the gray-level co-occurrence matrix ("GLCM") is computed for each image channel individually and the respective Haralick texture values are derived from each image channel separately.

In addition to the conventional gray-level co-occurrence matrix ("GLCM"), which is computed for each channel individually, the inter-channel or color co-occurrence matrix ("CCM") may be used. The CCM is created from the co-occurrence of pixel intensities in two different image channels, i.e. to compute the CCM from the two channels (e.g. Ci; Cj) using a displacement vector (e.g. d=[dx; dy]). The co-occurrence is computed of the pixel intensity at location (x;y) in Ci and the pixel intensity at location (x+dx; y+dy) in Cj. It is believed that the CCM offers that advantage of capturing the spatial relationship between different tissue structures (highlighted in different channels), without the need of explicitly segmenting them. For example, in case a first biomarker is known to be expressed on the outer surface of a cell membrane and a second biomarker is known to be expressed on the inner surface of a cell membrane, the first and second biomarkers being stained by different stains whose signals are captured in two different image channels, the intensity values of the signals in the two different channels will correlate (with a predefined offset), because inner-membrane proteins and outer-membrane proteins will always or predominantly generate signals in close spatial proximity to each other. Said spatial proximity may be captured in a CCM matrix in the form of pixel intensity correlations in different channels.

In some embodiments, Haralick features are computed from the GLCMs of all the channels under consideration. Again, any of the features computed from the CCM may be used as contextual information metrics. The inter-channel matrix is computed, according to embodiments, in the same or similar manner as the GLCM matrix. Multiple different angles and distances may be considered. The only difference is that the pair of pixels are picked from the two different channels, e.g., pixel p1 belong to image channel 1 and p2 belong to image channel 2, while these 2 pixels are considered to be in the same coordinate systems (so that the distance and angles between them can be computed). These features may likewise be supplied to the classification module.

Context-Texton Method

The context-texton method computes a histogram of a texton map from an image patch centered at each NoI. (Malik, Jitendra et al., "Textons, Contours and Regions: Cue Integration in Image Segmentation." s.i.: IEEE Computer Society, 1999, Proceedings of the International Conference on Computer Vision, Corfu, Greece, which is hereby incorporated by reference in its entirety). The texton map may be computed as follows:

Similar to the context-texture method, the goal of this method is also to capture the textural pattern in a region around each NoI. However, instead of deriving contextual information metrics from textural features as described above, and with reference to FIG. 6D, a bank of maximum response filters is applied on the image of the tissue sample (or to a channel image thereof) to obtain a list of filter response images (step 330). (See Varma and Zisserman, "Classifying images of materials: Achieving viewpoint and illumination independence," in Computer Vision ECCV 2002, 2002, vol. 2352, pp. 255-271, which is hereby incorporated by reference in its entirety)., Each filter response image is a digital image comprising one or more filter responses. A "filter response" may be a filter response as defined in [0018]. The filter response images derived from the training images and the filter responses contained therein are collected and clustered into a plurality of K clusters that are referred to as "textons" (step 331).

For example, each of the filter responses obtained by applying a plurality of maximum response filters on the image of the tissue sample may be a vector having some property values like diameter, intensity or the like. The clustering of said filter responses may provide a set of K clusters, whereby a cluster center is iteratively computed for each cluster as a vector of mean values of all filter responses belonging to said cluster. Each cluster center may thus be a "mean" filter response vector (whose values are mean values of respective feature vectors of filter responses assigned to said cluster center) or other form of "prototype" filter response vector derived from the filter responses assigned to said cluster center. Said "derivative" filter response vector representing the cluster center of a cluster is used as a "texton." For example, each cluster center represents a set of projections of each filter onto a particular image patch. Said K "cluster center textons", which may be iteratively refined, can be provided as output of the K-means clustering algorithm. The criterion for the clustering algorithm is to find K "centers" such that after assigning each filter response vector to the nearest center, the sum of the squared distance from the centers is minimized. Thus, by processing the information contained in the tissue sample image, a texton vocabulary of K textons is automatically extracted. Then, a texton map may be computed from the textons constituting the cluster centers.

Based on the plurality of trained cluster centers, each pixel of the image of the tissue sample is assigned into one of the K textons (step 332).

For example, the assignment may be performed such that each pixel in the image (or at least each pixel in the image patch centered around the NoI), is assigned to the one of the textons which is characteristic for the filter output generated for a set of pixels comprising said pixel to be mapped. Since each pixel is mapped to exactly one of the textons, the image is partitioned into regions assigned to different textons. Said "partitioned image" may be referred to as the "texton map":

A texton histogram is then computed from all the pixels in an image patch having a size S×S centered at the NoI (step 333). In some embodiments, the patch size ranges from between about 50 pixels to about 200 pixels in any S×S dimension. In other embodiments, a patch size of about 150 pixels (about 70 microns) is used. It has been observed that said patch size ranges are particularly suited for accurately identifying cell types for which texture related context information is a predictive parameter.

The contextual information metric supplied to the classifier as output (step 334) according to this method is the texton histogram. The texton histogram indicates the frequency of occurrence of the textons in said patch of pixels surrounding the NoI. The texton histogram is provided as an input to a classifier for enabling the classifier to identify the cell types of the cells in the tissue slide image. It is believed that the distribution of the textons provides a discriminative signature for each type of tissue and is used as an input to the classifier, along with the nuclear feature metrics computed.

Context-CRF Method

The context-CRF method employs the conditional random field (CRF) model to enhance the homogeneity of a classification result. (see J. Lafferty et al., Conditional Random Fields: Probabilistic Models for Segmenting and Labeling Sequence Data. ICML, pp. 282-289, 2001, the disclosure of which is incorporated herein by reference in its entirety). The CRF model, like the BoW model herein, utilizes the pre-computed nuclear features/metrics and labels from the neighboring nuclei as contextual information, thereby allowing the incorporation of contextual information with no additional feature extraction (as compared with the context texture method and the context texton method).

It is believed that the CRF model provides a natural way to incorporate pair-wise constraints, enforcing adjacent regions belonging to the same class.

For computation of the contextual information (CI) metrics, the CRF model is used to promote homogeneity of labeling results, i.e. it encourages closely located nuclei to have the same labels. It is believed that a homogeneous tissue region (tissue, stroma, etc.) usually contains nuclei of the same type. With $y=\{y_1, y_2, \ldots y_n\}$ and $x=\{x_1, x_2, \ldots x_n\}$ denoted as sets of all nucleus labels and nuclear feature vectors, respectively, the labeling problem is formalized as the optimization problem $y^*=\arg\_\min_y p(y|x)$. Such problems are usually solved using a graphical representation to factorize the probability distribution for efficient inference. Here, the relationship between the nuclei is modeled using a graph $G=(V,E)$, where each vertex $v_i \in V$, corresponding to a nucleus $n_i$. An edge $e_{ij} \in E$ is created between $v_i$ and $v_j$ if the distance between two nuclei $n_i$ and $n_j$ is less than d. In some embodiments, d=S/2=75 pixels). The y* are obtained by minimizing the Gibbs energy function:

$$E(y) = \sum_i \varphi_u(y_i | x_i) + \alpha \sum_{i,j} \varphi_p(y_i | y_j)$$

The unary potential $\varphi_u(y_i|x_i)$ is computed as the negative log probability output of a classifier, such as an SVM classifier. In some embodiments, using G, $\varphi_p(y_i|y_j)$ is set to $\|[y_i \neq y_j]$ if there is an edge between $v_i$ and $v_j$, otherwise $\varphi_p(y_i|y_j)=0$ is used. The energy output function is minimized using a graph cut approach. (See Y. Boykov, et al., "Fast approximate energy minimization via graph cuts," IEEE PAMI, vol. 23, pp. 1222-1239, 2011, the disclosure of which is incorporated by reference in its entirety). It is believed that a regularization parameter $\propto$ is an important parameter. Indeed, it is believed that a larger value of $\propto$ leads to a higher homogeneity of the labeling. The selection of the regularization parameters are illustrated in FIGS. 8a and 8b (different parameters are tested to find the best one). This method is different from other methods since it does not create an actual output. Rather, in this method, nuclear classification is first performed using nuclear features only, and then the initial nuclei labels are obtained. Subsequently, the CRF method helps to refine the initial nuclei labels to enhance the nuclei homogeneity, i.e., two closely located nuclei are more likely to have the same labels.

Context-BoW Method

The bag-of-words model is a simple yet powerful representation technique based on frequency of basic blocks (words). Bag-of-words (BoW), a widely-used feature encoding method, assumes that the local features extracted from images are independent of each other, and only counts the frequency of each visual "word" appearing in each image. As used herein, the "word" is a nuclear feature vector.

This method uses the observation that the contextual information of a NOI can be described via the appearance (e.g. number and/or cell type distribution) of its neighbors. In some embodiments, neighbors are defined as nuclei within a distance d=75 pixels. In other embodiments, the distance ranges from between about 25 pixels to about 100 pixels.

To capture the appearance of neighbors as contextual information, "bag of words" is used to quantize their appearance using the steps outlined below and as shown in FIGS. 3A and 3B.

First, a set of training images are provided. Each training image comprises a plurality of cells of different types, including PD-L1 positive and negative tumor cells and non-tumor cells, e.g. lymphocyte cells. The training images are used as input for a nucleus identification algorithm.

The nuclei are detected (step 600) and then the nuclear features are extracted for all nuclei in training images, as known in the art and according to the methods described above (see step 610). Next, a clustering procedure is performed using a K-means algorithm on all the training nuclear features to obtain "C" cluster centers (see step 620). In some embodiments, the K-means algorithm clusters the candidate "words" and the obtained cluster centers (C) are obtained to build the "visual vocabulary." For example, the nuclear feature metrics having been extracted for each of the nuclei in the training images are stored as nuclear feature vectors. Each identified nucleus is represented by its respective nuclear feature vector which comprises nuclear features and/or contextual information metrics of said nucleus. Then, a K-means algorithm is iteratively applied on the nuclear feature vectors of the training images, whereby the center of each cluster is represented as a computational nuclear feature vector derived as a vector of mean or average values of respective nuclear feature metrics of all nuclear feature metrics assigned to said cluster center. The nuclear feature vector representing the cluster center(s) are recalculated and refined in each iteration, wherein in each iteration the individual nuclear feature vectors are reassigned to respective cluster centers such that the difference between a nuclear feature of a nucleus of a training image and a respective feature value in the vector representing the cluster center is minimized. When a termination criterion is reached, a plurality of cluster centers are provided as a result of the training phase as the "visual vocabulary". Thereby, a trained classifier and a set of C pre-trained cluster centers, e.g. in the form of C nuclear feature vectors, is obtained in the training phase.

Next, in the image of the tissue sample, nuclei are identified, e.g. by means of an image segmentation algorithm, as described already for other embodiments of this invention. The image of the tissue sample is used as input for the classifier trained with the training images or having received the "visual library" (i.e., the trained classification model with the C cluster centers) from a machine learning application having performed the training step.

For a given NoI in said image of the tissue sample, its neighbors are then assigned to the closest cluster centers using the Euclidean distance of each neighbor's nuclear feature vector to the C centers, and a histogram of the cluster assignment is computed (see step 630). The histogram of cluster assignment indicates the number of nuclei contained in said environment of NoI which belong to a particular cluster. The cluster assignment of the nuclei in the neighborhood is a means to describe the environment around the NoI. This histogram is the contextual information metric of the NoI. Finally, the nuclear features and contextual features are combined into a single vector for training and classification.

In some embodiments, the context-BoW method is trained on a plurality of training nuclei from a plurality of training images by: (a) generating a nuclear feature vector for each nucleus of the training image based on one or more nuclear features extracted from each nucleus; (b) obtaining a plurality of pre-trained C clusters by performing a clustering procedure using a K-means algorithm on the nuclear feature vectors; (c) assigning each nucleus that neighbors the training nucleus to one of a plurality of C clusters by: (c1) measuring the Euclidean distance from the nuclear feature vector of each individual neighboring nucleus to the center of each C cluster; and (c2) assigning the individual neighboring nucleus to the cluster whose center is closest to the nuclear feature vector of that nucleus; (d) determining contextual features of each training nucleus by calculating a histogram of the cluster assignments of the neighboring nuclei; and (e) combining the nuclear features and contextual features into a single complete feature vector for the training nucleus; and (f) training a classification model using the complete feature vectors of all training nuclei.

In some embodiments, the context-BoW method classifies the nucleus of interest in a test image by (a) generating a nuclear feature vector for each nucleus of the test image based on one or more nuclear features extracted from the nucleus; (b) assigning each individual neighboring nucleus of the nucleus of interest to one of the plurality of pre-trained clusters by: (c1) measuring the Euclidean distance from the nuclear feature vector of each individual neighboring nucleus to the centers of the plurality of clusters; and (c2) assigning the individual neighboring nucleus to the cluster whose center is closest to the nuclear feature vector of that nucleus; (d) determining contextual features of the nucleus of interest by calculating a histogram of the cluster assignments of the neighboring nuclei; and (e) combining the nuclear feature vector of the nucleus of interest with the contextual features into a complete feature vector for the nucleus of interest (f) applying the trained classification model on the complete feature vector of the nucleus of interest to classify it.

In some embodiments, it is believed that a BoW method is more stable than a context-CRF method and/or requires lower computation cost than the context-texture and context-texton methods (since no additional features need to be computed).

Classification Module

After the nuclear metrics and contextual information metrics are derived by the feature extraction module, the metrics are provided to a classification module to detect and label cell nuclei according to type (e.g. tumor, immune, stroma, etc.) or a response to a particular stain (e.g. stain indicative of the presence of PDL1). In some embodiments, the classifier is trained and then used to distinguish five classes of nuclei in PD-L1 stained tissue including positive tumor, negative tumor, positive lymphocytes, non-target stain, and others (see FIGS. 7A and 7B, which shows five classes of nuclei in PD-L1 stained lung tissue images where positive tumor, negative tumor, positive lymphocytes, non-target stain, and others are indicated by green arrows ("E"), blue arrows ("A"), red arrows ("B"), yellow arrows ("C"), and cyan arrows ("D"), respectively). During training, example cells are presented together with a ground truth identification provided by an expert observer according to procedures known to those of ordinary skill in the art.

In some embodiments, the classification module is a Support Vector Machine ("SVM"). In general, a SVM is a classification technique, which is based on statistical learning theory where a nonlinear input data set is converted into a high dimensional linear feature space via kernels for the non-linear case. Without wishing to be bound by any particular theory, it is believed that support vector machines project a set of training data, E, that represents two different classes into a high-dimensional space by means of a kernel function, K. In this transformed data space, nonlinear data are transformed so that a flat line can be generated (a discriminating hyperplane) to separate the classes so as to maximize the class separation. Testing data are then projected into the high-dimensional space via K, and the test data are classified on the basis of where they fall with respect to the hyperplane. The kernel function K defines the method in which data are projected into the high-dimensional space.

As detailed in Example 1 below, Applicants performed extensive experimental evaluations to show that contextual information is useful for the classification of the PD-L1 nucleus. Moreover, Applicants have shown that the proposed context-Bow method is attractive as it offers good classification accuracy at low computational cost, which is of relevance for the analysis of tissue samples that typically contain many tens of thousands of cell nuclei.

Example 1

A comprehensive evaluation was performed using a nucleus database with the nuclei detected from tumor-burdened tissue from PD-L1-stained lung samples. Slides were scanned on VENTANA iScan HT scanners, resulting in RGB whole slide images with 0.465 μm pixel size.

For these PD-L1-stained tissue images (see FIGS. 7A and 7B), five different types of nuclei needed to be classified. The PD-L1 database included 256 images of 600×700 pixels, which were obtained from PD-LI-stained lung samples. The slides were again scanned on VENTANA iScan HT scanners, resulting in RGB whole slide images with 0.465 μm pixel size. From these images, a number of nuclei of five types were selected by a pathologist, including nuclei from PD-LI-positive tumor cells (2,414), from PD-LI-negative tumor cells (1,620), from PD-LI-positive lymphocytes (2,851), from non-target staining cells (1,753), and from the remaining PD-LI-negative cells (1,834) (FIGS. 7A and 7B). These are PD-L1-positive tumor nuclei, PD-L1-negative tumor nuclei, PD-L1-positive lymphocytes, non-target staining responses (non-target stain), and the remaining PD-L1-negative nuclei of other cells. The PD-L1 marker stains the membrane of cells, creating brown blobs or a brown ring along the nucleus boundaries. Table 1 summarizes the three databases. FIGS. 9 and 10 provide additional examples of classification results. In FIGS. 9 and 10, green (diamonds), blue (open circles), red (open squares), yellow (triangles), and cyan (asterisks) dots denote nuclei of positive tumor, negative tumor, positive lymphocytes, non-target stain, and others, respectively. FIGS. 9E and 9F show a particular segment of tissue and likewise indicate the nuclei of positive tumor, negative tumor, positive lymphocytes, non-target stain, and others.

A 10-fold image-based cross validation is performed for this database, and the average accuracies and standard deviations are reported. The nuclei in each image were used either for training or testing, i.e., nuclei were never tested with a model trained with nuclei been taken from the same image. Similar to other studies in the literature, an SVM classifier was used. The classification accuracy obtained when only nuclear features (no contextual information) were used as well as the accuracies obtained by the four context-aware methods are reported in Table 1. The context-CRF and context-Bow methods were further compared by plotting their accuracies with regard to parameter choices in FIGS. 8A and 8B. An evaluation of the performance of the context-Bow and context CRF methods with different parameter values (shown in FIGS. 8A and 8B) demonstrated that the context-BoW method was more stable against parameter choices.

As mentioned above, the important parameter of the context-CRF method is the regularization parameter, while that of the context-BoW method is the number of clusters C.

A "regularization parameter" is, for example, a parameter that controls the homogeneity of the labels assigned to the nuclei of a given cluster. The higher the value of this parameter, the higher the probability that nuclei assigned to the same class become assigned the same labels.

For all the three databases, the test of the context-CRF method includes 2 [0:001; 0:01; 0:05; 0:1; 0:5; 1] and the context-BoW method uses C 2 [10; 30; 50; 70; 100; 150; 200]. Results are reported for parameter choices that result in best accuracy. For the context-texture method, the only important parameter is the patch size S. This parameter is fixed as 150 pixels so that it matches the parameter d in context-CRF and context-BoW methods. The parameter d may, for example, be a distance threshold between two nuclei $n_i$ and $n_j$, wherein two nuclei are considered as neighbors if their distance is less than d. d may be, for example, 75 px. The same size of the local tissue neighborhood is enforced for fair comparisons. All classification accuracies are reported in Table 2.

These results led to the following main conclusions: (i) use of contextual information metrics in conjunction with nuclear metrics provided an improvement in nucleus classification accuracy as compared with the prior art which relied solely on nuclear metrics; (ii) the proposed context-Bow method was believed to perform better than the context-CRF method; (iii) and while the context-texture and context-texton methods performed slightly better than the context-BoW method, they were believed to require extra computation of texture features or filter responses for the image patch centered at each nucleus, which was computationally expensive. In contrast, the context-Bow and context-CRF methods utilized the pre-computed nuclear features and labels from the neighboring nuclei as CI, therefore allowed to them incorporate CI with no additional feature extraction.

TABLE 1

Classification accuracies (s.d.) obtained when using the nuclear metrics alone and when using the same nuclear metrics in combination with contextual information metrics (the CI metrics are shown as being obtained from four different methods). In all instances, the combination of CI metrics with nuclear metrics resulted in comparatively superior results.

| Database | Nuclear Features Alone | Context-Texture | Context-Texton | Context-CRF | Context-BoW |
| --- | --- | --- | --- | --- | --- |
| PD-L1 | 76.3 (9.3) | 83.0 (10.1) | 83.5 (8.2) | 80.8 (8.1) | 82.0 (7.2) |

Example 2

Figure 11A:
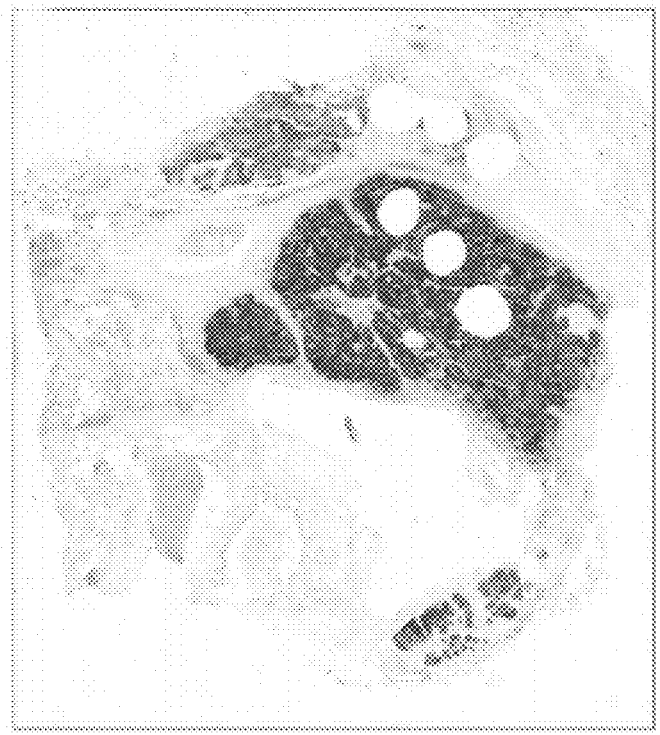
Figure 11B:
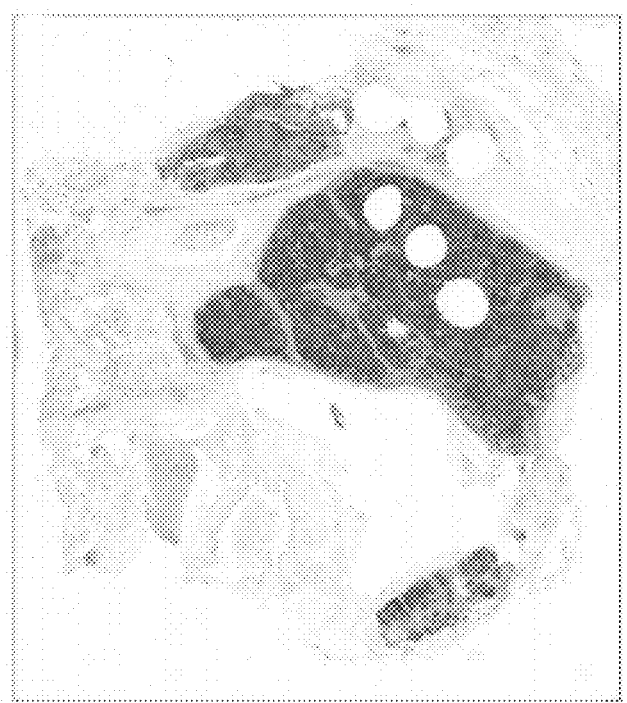
Figure 11C:
Figure 11D:
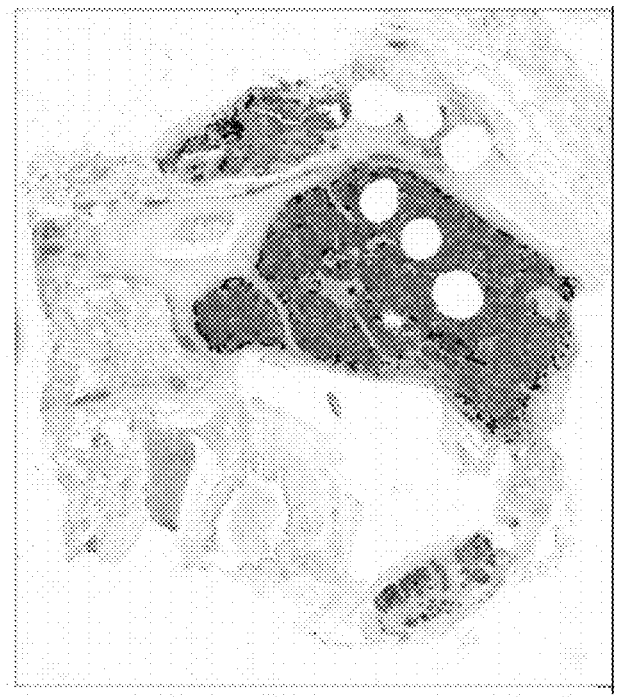

An example for the scoring of a PD-L1-stained slide is shown in FIGS. 11A-D. The digital image of a tissue specimen immunohistochemically stained with PD-L1 (labeled with DAB in brown) and the counterstain hematoxylin is shown in FIGS. 11A and 11B. An automated analysis implementing the disclosed method has detected cells individually (not seen in this resolution) and labeled them as one of a PD-L1-positive tumor cell, a PD-L1-negative tumor cell, a PD-L1-positive lymphocyte, or any other cell. From these automatically generated read-outs, the tissue on this slide was scored individually for its PD-L1 status with respect to immune and immune cells. To score the tumor cells, the fraction of PD-L1-positive tumor cells is divided by the total number of tumor cells (i.e., PD-L1 positive and PD-L1 negative tumor cells). The tissue on this slide was scored as about 90% of the tumor cells being positive for PD-L1. To score the immune cells, the area in the image that contains these cells is measured. The fraction of the tumor area that contains PD-L1-positive lymphocytes (immune cells) is scored. For the tissue presented in FIGS. 11B and 11D, the area of the tumor is 43.9 mm$^2$ (shown as a green or lightly shaded overlay), and the area with PD-L1-positive immune cells is 3.2 mm$^2$ (shown as a red or darkly shaded overlay). In consequence, the PD-L1 immune score for this tissue slide is 3.2/(3.2+43.9)=6.8%.

Other Components for Practicing Embodiments of the Present Disclosure

In another aspect of the present disclosure is a method of classifying a nucleus in a histology image, said method comprising analyzing the histology image on a computer apparatus comprising a computer processor programmed to classify a nucleus of interest (NoI) based on extracted features of the NoI and contextual information about an area surrounding the NoI. In some embodiments, the contextual information includes contextual information about nuclei surrounding the NoI. In some embodiments, the contextual information is calculated using a context-CRF method or a context-Bow method. In some embodiments, the context-BoW method has been trained on a plurality of training nuclei from a plurality of training images by: (a) generating a nuclear feature vector for each nucleus of the training image based on one or more nuclear features extracted from each nucleus; (b) obtaining a plurality of pre-trained C clusters by performing a clustering procedure using a K-means algorithm on the nuclear feature vectors; (c) assigning each nucleus that neighbors the training nucleus to one of a plurality of C clusters by: (c1) measuring the Euclidean distance from the nuclear feature vector of each individual neighboring nucleus to the center of each C cluster; and (c2) assigning the individual neighboring nucleus to the cluster whose center is closest to the nuclear feature vector of that nucleus; (d) determining contextual features of each training nucleus by calculating a histogram of the cluster assignments of the neighboring nuclei ("neighboring nuclei" are e.g. nuclei lying within a maximum distance from the core of said training nucleus and/or lying within a patch centered around said training nucleus, the patch having a dimension of e.g. 150 pixels (about 70 microns); and (e) combining the nuclear features and contextual features into a single complete feature vector for the training nucleus; (f) training a classification model using the complete feature vectors of all training nuclei. In some embodiments, the context-Bow method classifies the NoI in a test image by: (a) generating a nuclear feature vector for each nucleus of the test image based on one or more nuclear features extracted from the nucleus; (b) assigning each individual neighboring nucleus of the NoI to one of the pretrained C clusters by: (c1) measuring the Euclidean distance from the nuclear feature vector of each individual neighboring nucleus to the centers of the C clusters; and (c2) assigning the individual neighboring nucleus to the cluster whose center is closest to the nuclear feature vector of that nucleus; (d) determining contextual features of the NoI by calculating a histogram of the cluster assignments of the neighboring nuclei; and (e) combining the nuclear feature vector of the NoI with the contextual features into a complete feature vector for the NoI (f) applying the trained classification model on the complete feature vector of the NoI to classify it.

In the training as well as the testing phase, the histogram of cluster assignments indicates the number of nuclei being neighbor to a particular NoI that are assigned to a particular cluster (or cluster center). "Being assigned" may imply that the nuclear feature vector of a neighbor nucleus has a smaller Euclidian distance to the center of its assigned cluster than to the center of all other clusters. Thereby, each cluster center may also be represented as a nuclear feature vector and may be iteratively calculated and refined while performing the k-means clustering. The cluster center nuclear feature vector may be computed as a derivative, e.g. a vector of mean nuclear feature metrics, of the nuclear feature vectors of all neighbor nuclei assigned in a particular iteration to said cluster.

The computer system of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

A specimen can include a tissue sample. The sample of tissue can be any liquid, semi-solid or solid substance (or material) in or on which a target can be present. In particular, a tissue sample can be a biological sample or a tissue sample obtained from a biological tissue. The tissue can be a collection of interconnected cells that perform a similar function within an organism. In some examples, the biological sample is obtained from an animal subject, such as a human subject. A biological sample can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. In some examples, a biological sample is a nuclear extract. In certain examples, a sample is a quality control sample, such as one of the disclosed cell pellet section samples. In other examples, a sample is a test sample. For example, a test sample is a cell, a tissue or cell pellet section prepared from a biological sample obtained from a subject. In an example, the subject is one that is at risk or has acquired a particular condition or disease. In some embodiments, the specimen is breast tissue.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the waste remover removes the deparaffinizing fluid(s), any number of substances can be successively applied to the specimen. The substances can be for pretreatment (e.g., protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published Patent Application Nos. 20030211630 and 20040052685, each of which is incorporated herein by reference in its entirety. Alternatively, specimens can be manually processed.

After the specimens are processed, a user can transport specimen-bearing slides to the imaging apparatus. The imaging apparatus used here is a brightfield imager slide scanner. One brightfield imager is the iScan Coreo™ brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Application No. 61/533,114, filed on Sep. 9, 2011, entitled IMAGING SYSTEMS, CASSETTES, AND METHODS OF USING THE SAME. International Patent Application No. PCT/US2010/002772 and U.S. Patent Application No. 61/533,114 are incorporated by reference in their entities. In other embodiments, the imaging apparatus includes a digital camera coupled to a microscope.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a non-transitory computer-readable storage device, a non-transitory computer-readable storage substrate, a non-transitory random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

The foregoing written specification is considered to be sufficient to enable one skilled in the art to practice the disclosure.

The invention claimed is:

1. A computer system for classifying cells within an image of a tissue sample stained in an immunohistochemistry (IHC) assay, the computer system comprising:
one or more processors; and
at least one non-transitory computer-readable memory, the at least one memory storing instructions for execution by the one or more processors to cause the one or more processors to:
detect cell nuclei in the image of the tissue sample; and
for a cell nucleus of the cell nuclei:
determine a set of nuclear features based on portions of the image associated with the cell nucleus;
compute a set of nuclear feature metrics based on the set of nuclear features;
detect a set of other portions of the image associated with the cell nucleus, each other portion of the set of other portions including a region surrounding the cell nucleus;
identify a set of image texture features based on the set of other portions of the image, wherein at least one image texture feature of the set of image texture features is indicative of a presence of at least one biomarker in a corresponding portion of the set of other portions of the image;
compute a set of contextual information metrics based on the set of image texture features, wherein the set of contextual information metrics is indicative of a tissue classification corresponding to the region surrounding the cell nucleus; and
classify a cell associated with the cell nucleus based on the set of nuclear feature metrics and the set of contextual information metrics.

2. The computer system of claim 1, wherein a nuclear feature of the set of nuclear features is selected from a group consisting of morphology features, appearance features, and background features.

3. The computing system of claim 1, wherein the cells are classified as positive immune cells, positive tumor cells, negative immune cells, and/or negative tumor cells.

4. The computing system of claim 3, wherein the biomarker compenses a Programmed death-Ligand 1 (PD-L1) biomarker.

5. The computer system of claim 4, wherein the set of nuclear feature metrics is computed on a first image channel that represents a local overall staining intensity, a second image channel that represents an intensity of an IHC label indicative of a presence of a PD-L1 biomarker, and/or a third image channel that represents a local counterstain intensity indicative of a presence of a cell nucleus.

6. The computer system of claim 1, wherein the set of contextual information metrics is further computed from data describing neighboring nuclei that surround the cell nucleus.

7. The computer system of claim 6, wherein the set of image texture features are derived from an image patch surrounding the cell nucleus in the image of the tissue sample.

8. The computer system of claim 7, wherein an image texture feature of the set of image texture features is selected from a group consisting of texton histogram features, Garbor features, Haralick features, histogram of intensity features, and histogram of gradient magnitude and gradient orientation features.

9. The computer system of claim 7, wherein at least one of the set of image texture features is a texton histogram feature, wherein the texton histogram feature indicates a number of pixels contained in said image patch being respectively assigned to each of a plurality of textons.

10. The computer system of claim 9, wherein the texton histogram feature is derived by (1) applying a bank of maximum response filters on the image of the tissue sample to obtain a list of filter response images, each filter response image comprising one or more filter responses; (2) clustering the filter responses from the filter response images into textons; (3) assigning each pixel in the image of the tissue sample into one of the textons; and (4) computing the texton histogram feature from all the pixels in the image patch surrounding the cell nucleus.

11. The computer system of claim 8, wherein at least one of the set of image texture features is a histogram of intensity features, and wherein the histogram of intensity features is derived from image channels selected from the group consisting of a primary stain channel, a counterstain channel, an IHC stain channel, and a luminance channel.

12. The computer system of claim 11, wherein differences in signals from the image channels are analyzed to compute intensity-based features within the image patch surrounding the cell nucleus, the intensity-based features comprising metric values derived from pixel intensity values within the image patch.

13. The computer system of claim 8, wherein the set of image texture features includes Haralick features, wherein Haralick features are derived from a co-occurrence matrix based on an angular relationship between a pixel and its specified neighbor in the image patch.

14. The computer system of claim 6, wherein the data describing neighboring nuclei is derived from a histogram of cluster assignment.

15. The computer system of claim 14, wherein the histogram of cluster assignment is derived by (1) applying a K-means algorithm on nuclear feature vectors to obtain cluster centers; (2) assigning individual neighboring nuclei of the cell nucleus to a closest cluster center; and (3) computing the histogram of cluster assignment based on the assigning.

16. The computer system of claim 15, further comprising the steps of (2a) measuring an Euclidean distance from a nuclear feature vector of each individual neighboring nucleus to a center of each cluster; and (2b) assigning an individual neighboring nucleus of the individual neighboring nuclei to a cluster whose center is closest to a nuclear feature vector of the nuclear feature vectors.

17. The computer system of claim 1, wherein the cells of the image of the tissue sample are classified with a support vector machine.

18. The computer system of claim 1, wherein the classification of the cells within the image of the tissue sample is performed by a trained classifier, wherein the instructions cause the one or more processors to generate the trained classifier by: automatically performing a computational training of a classifier on a plurality of training nuclei, a training nucleus being a nucleus identified in one of a plurality of training images, by: (a) generating a nuclear feature vector for each training nucleus of each training image by extracting one or more nuclear feature metrics from each training nucleus; (b) obtaining a plurality of C pre-trained clusters by performing a clustering procedure using a K-means algorithm on the nuclear feature vectors; (c) assigning each nucleus that neighbors the training nucleus in one of the training images to one of the plurality of C pre-trained clusters by: (c1) measuring an Euclidean distance from the nuclear feature vector of each individual neighboring nucleus to a center of each cluster; and (c2) assigning each neighbor nucleus of each nucleus of each training image to a cluster whose center has a smallest Euclidian distance to the nuclear feature vector representing the center of that nucleus; (d) determining, for each of the training nuclei in the training images, contextual feature metrics of said training nucleus by calculating a histogram of cluster assignments of all training nuclei being neighbor nuclei of said training nucleus; and (e) for each training nucleus in each of the training images, combining the one or more nuclear feature metrics of said training nucleus and the contextual feature metrics of said training nucleus into a single complete feature vector for the training nucleus; (f) training a classification model using complete feature vectors of all training nuclei as input.

19. The computer system of claim 1, the instructions causing the one or more processors to perform a method comprising:
    (a) generating, by a trained classifier, a nuclear feature metrics vector for the cell nucleus by performing the computation of the set of nuclear feature metrics; (b) assigning each nucleus in the tissue sample image being a neighbor of the cell nucleus within the image of the tissue sample to one of a plurality of C pretrained clusters by: (c1) measuring an Euclidean distance from the nuclear feature metrics vector of each individual neighboring nucleus to C cluster centers of the trained classifier; and (c2) assigning the individual neighboring nucleus to a cluster whose center is closest to the nuclear feature metrics vector; (d) performing the computation of the set of contextual information metrics of the cell nucleus in the image of the tissue sample by calculating a histogram of cluster assignments of the neighboring nuclei of the cell nucleus; and (e) combining the nuclear feature metrics vector of the cell nucleus in the image of the tissue sample with the set of contextual information metrics into a complete feature vector of said cell nucleus; and (f) performing the classification of one of the cells within the image of the tissue sample comprising said cell nucleus by applying the trained classifier on the complete feature vector of the cell nucleus to classify it.

20. A computer-implemented method of classifying cells within an image of a tissue sample stained in an immunohistochemistry (IHC) assay, the method comprising:
    detecting cell nuclei in the image of the tissue sample; and
    for a cell nucleus of the cell nuclei:
        determining a set of nuclear features based on portions of the image associated with the cell nucleus;
        computing a set of nuclear feature metrics based on the set of nuclear features;
        detecting a set of other portions of the image associated with the cell nucleus, each other portion of the set of other portions including a region surrounding the cell nucleus;
        identifying a set of image texture features based on the set of other portions of the image, wherein at least one image texture feature of the set of image texture features is indicative of a presence of at least one biomarker in a corresponding portion of the set of other portions of the image;
        computing a set of contextual information metrics based on the set of image texture features, wherein the set of contextual information metrics is indicative of a tissue classification corresponding to the region surrounding the cell nucleus; and
        classifying a cell associated with the cell nucleus based on the set of nuclear feature metrics and the set of contextual information metrics.

21. The computer-implemented method of claim 20, wherein the cells are classified as positive immune cells, positive tumor cells, negative immune cells, and/or negative tumor cells.

22. The computer-implemented method of claim 21, wherein the biomarker comprises a Programmed death-Ligand 1 (PD-L1) biomarker.

23. The computer-implemented method of claim 22, further comprising:
    (a) determining a number of tumor cells and immune cells expressing PD-L1 and/or a relative intensity of PD-L1 expression in the cells; and
    (b) categorizing a tumor according to the PD-L1 expression determined in step (a).

24. The computer-implemented method of claim 23, wherein the expression of PD-L1 is determined by specifically detecting PD-L1 protein and/or PD-L1 mRNA in the tumor.

25. The computer-implemented method of claim 23, wherein the cells are considered to express PD-L1 in response to the cells including at least partial membrane staining of PD-L1 protein.

26. The computer-implemented method of claim 23, wherein the tumor is categorized by a modified H-score (MHS), a modified proportion score (MPS), or both MHS and MPS, each computed from step (a).

27. A computer system for classifying cells within an image of a tissue sample stained in an immunohistochemistry (IHC) assay, the computer system comprising:
    one or more processors; and
    at least one non-transitory computer-readable memory, the at least one memory storing instructions for execution by the one or more processors to cause the one or more processors to:
    run a feature extraction module that:
        detects cell nuclei in the image of the tissue sample; and
        for a cell nucleus of the cell nuclei:
            determines a set of nuclear features based on portions of the image associated with the cell nucleus;
            computes a set of nuclear feature metrics based on the set of nuclear features;
            detects a set of other portions of the image associated with the cell nucleus, each other portion of the set of other portions including a region surrounding the cell nucleus;
            identifies a set of image texture features based on the set of other portions of the image, wherein at least one image texture feature of the set of image texture features is indicative of a presence of at least one biomarker in a corresponding portion of the set of other portions of the image;
            computes a set of contextual information metrics based on the set of image texture features, wherein the set of contextual information metrics is indicative of a tissue classification corresponding to the region surrounding the cell nucleus; and
    run a classification module that classifies a cell associated with the cell nucleus, wherein the cell is classified as positive immune cells, positive tumor cells, negative immune cells, and negative tumor cells, and/or other cells.

28. The computer system of claim 27, wherein the set of contextual information metrics are derived from data describing neighboring nuclei surrounding the cell nucleus.

29. The computer system of claim 28, wherein the set of image texture features is computed from an image patch surrounding the nucleus of interest.

30. The computer system of claim 29, wherein the set of image texture features is computed through application of one of a context-texture method or a context-texton method.

31. The computer system of 28, wherein the data describing neighboring nuclei are computed through application of one of a context conditional random field method or a context bag of words method.

32. The computer system of claim 27, wherein the system further comprises running an image acquisition module to obtain image of tissue samples of the tissue specimen.

\* \* \* \* \*